US012562872B2

(12) United States Patent (10) Patent No.: US 12,562,872 B2
Hao et al. (45) Date of Patent: Feb. 24, 2026

(54) COMMUNICATION METHOD AND RELATED APPARATUS FOR POSITIONING AN ELECTRONIC DEVICE

(71) Applicant: HUAWEI TECHNOLOGIES CO., LTD., Shenzhen (CN)

(72) Inventors: Jinping Hao, Shanghai (CN); Yinghao Jin, Boulogne Billancourt (FR); Yinghao Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 18/328,459

(22) Filed: Jun. 2, 2023

(65) Prior Publication Data

US 2023/0308243 A1 Sep. 28, 2023

Related U.S. Application Data

(63) Continuation of application No. PCT/CN2020/134030, filed on Dec. 4, 2020.

(51) Int. Cl.
*H04W 72/04* (2023.01)
*H04L 5/00* (2006.01)
*H04W 76/27* (2018.01)

(52) U.S. Cl.
CPC .......... *H04L 5/0051* (2013.01); *H04L 5/0035* (2013.01); *H04W 76/27* (2018.02)

(58) Field of Classification Search
CPC ... H04L 5/0051; H04L 5/0035; H04L 5/0094; H04L 5/0048; H04W 76/27;
(Continued)

(56) References Cited

U.S. PATENT DOCUMENTS

2018/0199160 A1* 7/2018 Edge ....................... H04W 4/02
2019/0053010 A1* 2/2019 Edge .................... H04W 4/029
(Continued)

FOREIGN PATENT DOCUMENTS

CN 101951682 A 1/2011
CN 102461015 A 5/2012
(Continued)

OTHER PUBLICATIONS

Huawei, "(TP for POS BL CR for TS 38.423, TS 38.455, TS 38.473) Discussion on RRC Inactive positioning," 3GPP TSG-RAN WG3 Meeting #114-e, R3-215391, E-meeting, Nov. 1-11, 2021, 19 pages.
(Continued)

*Primary Examiner* — Mahbubul Bar Chowdhury
(74) *Attorney, Agent, or Firm* — Fish & Richardson P.C.

(57) ABSTRACT

Embodiments of this application disclose communication methods and apparatuses, to position a terminal device by a positioning device. In an implementation, a method comprises: sending, by a first access network device, a retrieve UE context request message to a source access network device, receiving a retrieve UE context response message from the source access network device, wherein the retrieve UE context response message comprises reference information for configuring a sounding reference signal (SRS) of a terminal device in an inactive state, determining SRS configuration information of the terminal device based on the reference information, and sending the SRS configuration information to the terminal device.

10 Claims, 9 Drawing Sheets

(58) Field of Classification Search

CPC ....... H04W 64/00; H04W 4/02; H04W 4/029; H04W 72/0446; H04W 72/0453; H04W 72/23; H04W 24/08; H04W 68/02

See application file for complete search history.

(56) References Cited

U.S. PATENT DOCUMENTS

| | | | | |
|---|---|---|---|---|
| 2019/0182665 | A1* | 6/2019 | Edge ..................... | H04W 12/06 |
| 2020/0314667 | A1 | 10/2020 | Fujishiro et al. | |
| 2020/0358576 | A1 | 11/2020 | Zarifi et al. | |
| 2021/0274458 | A1* | 9/2021 | Edge ..................... | H04W 64/00 |
| 2022/0120842 | A1* | 4/2022 | Edge ..................... | H04W 76/19 |
| 2022/0368496 | A1* | 11/2022 | Shreevastav .......... | H04L 5/0094 |
| 2023/0276521 | A1* | 8/2023 | Fu ......................... | H04W 76/27 |
| | | | | 370/310 |

FOREIGN PATENT DOCUMENTS

| | | |
|---|---|---|
| CN | 111586855 A | 8/2020 |
| CN | 111600686 A | 8/2020 |
| CN | 111865524 A | 10/2020 |
| EP | 3923651 A1 | 12/2021 |
| WO | 2020168573 A1 | 8/2020 |
| WO | 2022098480 A2 | 5/2022 |

OTHER PUBLICATIONS

Office Action in Japanese Appln. No. 2023-534134, mailed on Dec. 3, 2024, 6 pages (with English translation).

Qualcomm Incorporated, "Potential Positioning Enhancements for NR Rel-17 Positioning," 3GPP TSG RAN WG1 #103-e, R1-2008619, e-Meeting, Oct. 26-Nov. 13, 2020, 17 pages.

Huawei et al., "Discussion on IDLE/INACTIVE state positioning, on-demand PRS, and latency analysis," 3GPP TSG-RAN WG2 Meeting #112 electronic, R2-2010276, Online, Nov. 2-13, 2020, 14 pages.

Office Action in Japanese Appln. No. 2023-534134, mailed on Jun. 11, 2024, 8 pages (with English translation).

Qualcomm Incorporated, "NR Positioning Latency Analysis and Enhancements," 3GPP TSG-RAN Meeting #112-e, R2-2010096, Electronic, Nov. 2-13, 2020, 29 pages.

Huawei et al., "Discussion on R17 Positioning enhancement," 3GPP TSG-RAN WG2 Meeting #112-e, R2-2010277, Electronic, Nov. 2-13, 2020, 4 pages.

International Search Report and Written Opinion in International Appln. No. PCT/CN2020/134030, mailed on Sep. 6, 2021, 17 pages (with English translation).

Extended European Search Report in European Appln. No. 20964038. 2, mailed on Dec. 6, 2023, 10 pages.

* cited by examiner

COMMUNICATION METHOD AND RELATED APPARATUS FOR POSITIONING AN ELECTRONIC DEVICE

CROSS-REFERENCE TO RELATED APPLICATIONS

This application is a continuation of International Application No. PCT/CN2020/134030, filed on Dec. 4, 2020, the disclosure of which is hereby incorporated by reference in its entirety.

TECHNICAL FIELD

This application relates to communication technologies, and in particular, to a communication method and a related apparatus.

BACKGROUND

A positioning function is an important function of 5G new radio (new radio, NR). Currently, in an uplink positioning technology, a location management function (location management function, LMF) device requests a last serving base station of user equipment (user equipment, UE) to configure sounding reference signal (sounding reference signal, SRS) configuration information for the UE. The UE is in inactive state. The last serving base station is a serving base station that releases the UE to the inactive state. The last serving base station may configure an SRS resource for the UE, and send the SRS configuration information of the UE to the UE. In addition, the last serving base station sends the SRS configuration information of the UE to the LMF device in response to the SRS configuration information request of the LMF device. Then, the LMF device selects a measurement base station, and sends a measurement request to the measurement base station. The measurement base station measures an SRS sent by the UE, and reports a positioning information measurement result of the UE to the LMF device. In this way, the LMF device positions the UE based on the positioning information measurement result.

However, when the UE is in inactive state, and the UE moves from the last serving base station to another new base station, the LMF device still requests the last serving base station to configure the SRS configuration information for the UE. Because the UE moves from the last serving base station to the another new base station, the last serving base station cannot configure the SRS configuration information for the UE. As a result, the LMF device fails to request to configure the SRS configuration information for the UE, and the LMF device cannot position the UE.

SUMMARY

Embodiments of this application provide a communication method and a related apparatus, to position a terminal device by a positioning device.

A first aspect of embodiments of this application provides a communication method. The communication method includes:

A first access network device sends a retrieve UE context request message to a source access network device. Then, the first access network device receives a retrieve UE context response message from the source access network device. The retrieve UE context response message includes reference information used to configure a sounding reference signal of a terminal device, and/or information used to indicate to configure the SRS for the terminal device. The terminal device is in inactive state. The first access network device determines SRS configuration information of the terminal device based on the reference information and/or the information used to indicate to configure the SRS for the terminal device. The first access network device sends the SRS configuration information to the terminal device.

In this embodiment, the terminal device is in inactive state, and the first access network device may obtain, in a process of requesting a context of the terminal device from the source access network device, the reference information used to configure the SRS of the terminal device. Then, the first access network device determines the SRS configuration information of the terminal device based on the reference information used to configure the SRS of the terminal device, and sends the SRS configuration information to the terminal device, to configure the SRS for the terminal device. In this way, when the terminal device is in inactive state, a positioning device may successfully request to configure the SRS for the terminal device, so that the positioning device positions the terminal device. In other words, the technical solution of this embodiment of this application avoids a problem that the positioning device fails to position the terminal device because the positioning device fails to request to configure the SRS for the terminal device.

In a possible implementation, the reference information includes information about a sounding reference signal transmission characteristic, and the information about the sounding reference signal transmission characteristic includes at least one of the following: a sending periodicity, bandwidth, or transmission frequency that is of the SRS configured for the terminal device and that is recommended by a positioning device.

In this possible implementation, the source access network device assists the first access network device in configuring the SRS for the terminal device by using the sending periodicity, bandwidth, or transmission frequency that is of the SRS configured for the terminal device and that is recommended by the positioning device, so that the positioning device positions the terminal device.

In another possible implementation, the retrieve UE context response message includes a routing identifier, and the routing identifier identifies the positioning device.

In this possible implementation, the source access network device sends the routing identifier to the first access network device in the retrieve UE context response message. In this way, after the first access network device obtains the routing identifier, the first access network device determines the SRS configuration information of the terminal device. Then, the first access network device may send the SRS configuration information of the terminal device to the positioning device via a core network device, and include the routing identifier in a message used to send the SRS configuration information. The core network device identifies, based on the routing identifier, the positioning device corresponding to the routing identifier. Then, the positioning device forwards, to the positioning device, the SRS configuration sent by the first access network device to the positioning device, so that the positioning device positions the terminal device.

In another possible implementation, the retrieve UE context request message includes any one of the following: first information or second information. The first information is used to request the reference information. The second information is used to request positioning information of the terminal device.

In this possible implementation, in a process of obtaining a context of the terminal device, the retrieve UE context request message sent by the first access network device to the source access network device includes the first information and/or the second information. The source access network device may learn, based on the retrieve UE context request message, that the first access network device requests to obtain the UE context. Further, the source access network device may further learn that the first access network device requests to obtain the reference information or the positioning information of the terminal device, so that the source access network device sends the reference information or the positioning information to the first access network device.

In another possible implementation, the method further includes: The first access network device receives a paging message from the source access network device. The paging message includes at least one of the following: third information, the reference information, fourth information, or fifth information. The third information is used to indicate that the paging message is used to position the terminal device. The fourth information is used to request the positioning information of the terminal device. The fifth information is used to request to configure the SRS for the terminal device.

In this possible implementation, the paging message includes at least one of the following: the third information, the reference information, the fourth information, or the fifth information. In this case, the first access network device may learn of a cause or purpose of paging performed by the source access network device, to be specific, positioning of the terminal device or configuration of the SRS. Subsequently, the first access network device may page the terminal device and configure the SRS for the terminal device. Further, the first access network device may release the terminal device as soon as possible, so that the terminal device enters or is in inactive state. This avoids energy consumption of the terminal device.

In another possible implementation, the paging message further includes the routing identifier, and the routing identifier identifies the positioning device.

In this possible implementation, the source access network device sends the routing identifier to the first access network device in the paging message. In this way, after the first access network device determines the SRS configuration information of the terminal device, the first access network device may send the SRS configuration information of the terminal device to the positioning device via a core network device, and include the routing identifier in a message used to send the SRS configuration information. The core network device identifies, based on the routing identifier, the positioning device corresponding to the routing identifier, and forwards, to the positioning device, the SRS configuration sent by the first access network device to the positioning device, so that the positioning device positions the terminal device.

In another possible implementation, that the first access network device sends the SRS configuration information to the terminal device includes: The first access network device sends a radio resource control (radio resource control, RRC) release message to the terminal device. The RRC release message includes the SRS configuration information.

In this possible implementation, the first access network device pages the terminal device to position the terminal device or configure the SRS for the terminal device. The first access network device may send the RRC release message to the terminal device, so that the terminal device is in inactive state. This avoids energy consumption caused by the terminal device entering a connected state. In addition, the first access network device delivers the SRS configuration information to the terminal device in the RRC release message, to configure the SRS for the terminal device. In addition, a delay of delivering the SRS configuration information to the terminal device by the first access network device is reduced, to deliver the SRS configuration information to the terminal device earlier and more quickly. An extra delay caused by positioning of the terminal device is avoided, and positioning efficiency is improved.

In another possible implementation, the method further includes: The first access network device sends a UE context release message to the source access network device. The UE context release message includes the SRS configuration information.

In this possible implementation, the source access network device may send the SRS configuration information to the positioning device, so that the positioning device positions the terminal device.

A second aspect of embodiments of this application provides a communication method. The communication method includes:

A source access network device receives a retrieve UE context request message sent by a first access network device. Then, the source access network device sends a retrieve UE context response message to the first access network device. The retrieve UE context response message includes reference information used to configure an SRS of a terminal device, and/or information used to indicate to configure the SRS for the terminal device. The terminal device is in inactive state.

In this embodiment, the terminal device is in inactive state, and the source access network device may request, from the first access network device in a process of requesting a context of the terminal device by the first access network device, the reference information used to configure the SRS of the terminal device. Then, the first access network device determines SRS configuration information of the terminal device based on the reference information used to configure the SRS of the terminal device, and sends the SRS configuration information to the terminal device, to configure the SRS for the terminal device. In this way, when the terminal device is in inactive state, a positioning device may successfully request to configure the SRS for the terminal device, so that the positioning device positions the terminal device. In other words, the technical solution of this embodiment of this application avoids a problem that the positioning device fails to position the terminal device because the positioning device fails to request to configure the SRS for the terminal device.

In a possible implementation, the reference information includes information about a sounding reference signal transmission characteristic, and the information about the sounding reference signal transmission characteristic includes at least one of the following: a sending periodicity, bandwidth, or transmission frequency that is of the SRS configured for the terminal device and that is recommended by a positioning device.

In this possible implementation, the source access network device assists the first access network device in configuring the SRS for the terminal device by using the sending periodicity, bandwidth, or transmission frequency that is of the SRS configured for the terminal device and that is recommended by the positioning device, so that the positioning device positions the terminal device.

In another possible implementation, the retrieve UE context response message includes a routing identifier, and the routing identifier identifies the positioning device.

In this possible implementation, the source access network device sends the routing identifier to the first access network device in the retrieve UE context response message. In this way, after the first access network device obtains the routing identifier, the first access network device determines SRS configuration information of the terminal device. Then, the first access network device may send the SRS configuration information of the terminal device to the positioning device via a core network device, and include the routing identifier in a message used to send the SRS configuration information. The core network device identifies, based on the routing identifier, the positioning device corresponding to the routing identifier, and forwards, to the positioning device, the SRS configuration sent by the first access network device to the positioning device, so that the positioning device positions the terminal device.

In another possible implementation, the retrieve UE context request message includes any one of the following: first information or second information. The first information is used to request the reference information. The second information is used to request positioning information of the terminal device.

In this possible implementation, in a process of obtaining a context of the terminal device, the retrieve UE context request message sent by the first access network device to the source access network device includes the first information and/or the second information. The source access network device may learn, based on the retrieve UE context request message, that the first access network device requests to obtain the UE context. Further, the source access network device may further learn that the first access network device requests to obtain the reference information or the positioning information of the terminal device, so that the source access network device sends the reference information or the positioning information to the first access network device.

In another possible implementation, the method further includes: The source access network device sends a paging message to the first access network device. The paging message includes any one of the following: third information, the reference information, fourth information, or fifth information. The third information is used to indicate that the paging message is used to position the terminal device. The fourth information is used to request the positioning information of the terminal device. The fifth information is used to request to configure the SRS for the terminal device.

In this possible implementation, the first access network device may learn, based on at least one of the third information, the reference information, the fourth information, or the fifth information included in the paging message, a cause or a purpose of paging performed by the source access network device. In this way, the first access network device may page the terminal device and configure the SRS for the terminal device. Further, after the first access network device configures the SRS for the terminal device, the first access network device may release the terminal device as soon as possible, so that the terminal device enters or is in inactive state, to avoid energy consumption of the terminal device.

In another possible implementation, the method further includes: The source access network device receives a UE context release message from the first access network device. The UE context release message includes SRS configuration information. Then, the source access network device sends the SRS configuration information to the positioning device.

In this possible implementation, the source access network device may send the SRS configuration information to the positioning device, so that the positioning device positions the terminal device.

A third aspect of embodiments of this application provides a communication method. The communication method includes:

A terminal device sends an RRC resume request message to a first access network device. Then, the terminal device receives an RRC release message from the first access network device. The RRC release message includes SRS configuration information. The SRS configuration information is determined by the first access network device based on reference information used to configure an SRS of the terminal device.

In this embodiment, the first access network device may send the RRC release message to the terminal device, so that the terminal device is in inactive state. This avoids energy consumption caused by the terminal device entering a connected state. In addition, the first access network device delivers the SRS configuration information to the terminal device in the RRC release message, to configure the SRS for the terminal device. In addition, a delay of delivering the SRS configuration information to the terminal device by the first access network device is reduced, to deliver the SRS configuration information to the terminal device earlier and more quickly. An extra delay caused by positioning of the terminal device is avoided, and positioning efficiency is improved.

In a possible implementation, the reference information includes information about a sounding reference signal transmission characteristic, and the information about the sounding reference signal transmission characteristic includes at least one of the following: a sending periodicity or bandwidth that is of the SRS configured for the terminal device and that is recommended by a positioning device.

In this possible implementation, the sending periodicity or bandwidth that is of the SRS configured for the terminal device and that is recommended by the positioning device is used to assist the first access network device in configuring the SRS for the terminal device, so that the positioning device positions the terminal device.

A fourth aspect of embodiments of this application provides a communication method. The communication method includes:

A positioning device sends a positioning information request message to an access network device. Then, the positioning device receives a positioning information response message from the access network device. The positioning information response message includes at least one of the following: information indicating that the positioning device re-requests to configure an SRS for a terminal device, where the terminal device is in inactive state; information indicating that the terminal device has left the access network device, where the terminal device is in inactive state; information indicating that the terminal device has left a cell managed by the access network device, where the terminal device is in inactive state; or information indicating that the terminal device in inactive state has left the access network device.

In this embodiment, the access network device sends the positioning information response message to the positioning device. The positioning information response message includes the information indicating that the positioning device re-requests to configure the SRS for the terminal device; the information indicating that the terminal device has left the access network device, where the terminal device is in inactive state; the information indicating that the terminal device has left the cell managed by the access network device, where the terminal device is in inactive state; or the information indicating that the terminal device in inactive state has left the access network device. In this way, the positioning device does not understand as: the SRS cannot be configured for the terminal device when the terminal device is within a signal coverage area of the access network device, and consequently, the positioning device considers that the terminal device cannot be positioned. The positioning device may re-request, in combination with the positioning response message, to configure the SRS for the terminal device, to subsequently position the terminal device.

A fifth aspect of embodiments of this application provides a communication method. The communication method includes:

A positioning device sends a positioning information request message to an access network device. Then, the positioning device receives a positioning information failure message from the access network device. The positioning information failure message includes a cause. The cause is used to indicate that the terminal device has left the access network device, where the terminal device is in inactive state; the cause is used to indicate that the terminal device has left a cell managed by the access network device, where the terminal device is in inactive state; or the cause is used to indicate that the terminal device in inactive state has left the access network device.

In this embodiment, the positioning device receives the positioning information failure message from the access network device. The positioning information failure message includes the cause. The cause is used to indicate that the terminal device has left the access network device, where the terminal device is in inactive state; the cause is used to indicate that the terminal device has left the cell managed by the access network device, where the terminal device is in inactive state; or the cause is used to indicate that the terminal device in inactive state has left the access network device. In this way, the positioning device does not understand as: An SRS cannot be configured for the terminal device when the terminal device is within a signal coverage area of the access network device, and consequently, the positioning device considers that the terminal device cannot be positioned. The positioning device may re-request, in combination with a positioning response message, to configure the SRS for the terminal device, to subsequently position the terminal device.

A fifth aspect of embodiments of this application provides a communication method. The communication method includes:

A source access network device receives a positioning information request message from a positioning device. Then, the source access network device sends a positioning information response message to the positioning device. The positioning information response message includes at least one of the following: information indicating that the positioning device re-requests to configure an SRS for a terminal device, where the terminal device is in inactive state; information indicating that the terminal device has left the source access network device, where the terminal device is in inactive state; information indicating that the terminal device has left a cell managed by the source access network device, where the terminal device is in inactive state; or information indicating that the terminal device in inactive state has left the source access network device.

In this embodiment, the source access network device sends the positioning information response message to the positioning device. The positioning information response message includes at least one of the following: the information indicating that the positioning device re-requests to configure the SRS for the terminal device; the information indicating that the terminal device has left the source access network device; the information indicating that the terminal device has left the cell managed by the source access network device; or the information indicating that the terminal device in inactive state has left the source access network device. In this way, the positioning device does not understand as: The SRS cannot be configured for the terminal device when the terminal device is within a signal coverage area of the source access network device, and consequently, the positioning device considers that the terminal device cannot be positioned. The positioning device may re-request, in combination with the positioning response message, to configure the SRS for the terminal device, to subsequently position the terminal device.

In a possible implementation, the method further includes: The source access network device sends a paging message to a first access network device. The paging message includes at least one of the following: first information, second information, or third information. The first information is used to indicate that the paging message is used to position the terminal device. The second information is used to request positioning information of the terminal device. The third information is used to request to configure the SRS for the terminal device.

In this possible implementation, the first access network device may learn, based on at least one of the first information, the second information, or the third information included in the paging message, a cause or a purpose of paging performed by the source access network device. In this way, the first access network device may page the terminal device and configure the SRS for the terminal device. Further, after the first access network device configures the SRS for the terminal device, the first access network device may release the terminal device as soon as possible, so that the terminal device enters or is in inactive state, to avoid energy consumption of the terminal device.

In another possible implementation, before the source access network device sends the positioning information response message to the positioning device, the method further includes: The source access network device receives a UE context release message from the first access network device.

In this possible implementation, after the source access network device receives the UE context release message for the terminal device from the first access network device, the source access network device may determine that the terminal device has accessed the first access network device. The source access network device sends the positioning information response message to the positioning device. This ensures that the terminal device has entered a connected state when the positioning device requests to configure the SRS for the terminal device again. In this case, the positioning device may successfully request the first access network device to request configuration of the SRS for the terminal device, so that the positioning device subsequently positions the terminal device.

A sixth aspect of embodiments of this application provides a communication method. The communication method includes:

A source access network device receives a positioning information request message from a positioning device. The source access network device sends a positioning information failure message to the positioning device. The positioning information failure message includes a cause. The cause is used to indicate that the terminal device has left the source access network device, where the terminal device is in inactive state; the cause is used to indicate that the terminal device has left a cell managed by the source access network device, where the terminal device is in inactive state; or the cause is used to indicate that the terminal device in inactive state has left the source access network device.

In this embodiment, the source access network device sends the positioning information failure message to the positioning device. The positioning information failure message includes the cause. The cause is used to indicate that the terminal device has left the source access network device; the cause is used to indicate that the terminal device has left the cell managed by the source access network device; or the cause is used to indicate that the terminal device in inactive state has left the source access network device. In this way, the positioning device does not understand as: An SRS cannot be configured for the terminal device when the terminal device is within a signal coverage area of the source access network device, and consequently, the positioning device considers that the terminal device cannot be positioned. The positioning device may re-request, in combination with a positioning response message, to configure the SRS for the terminal device, to subsequently position the terminal device.

In a possible implementation, the method further includes: The source access network device sends a paging message to a first access network device. The paging message includes at least one of the following: first information, second information, or third information. The first information is used to indicate that the paging message is used to position the terminal device. The second information is used to request positioning information of the terminal device. The third information is used to request to configure an SRS for the terminal device.

In this possible implementation, the first access network device may learn, based on at least one of the first information, the second information, or the third information included in the paging message, a cause or a purpose of paging performed by the source access network device. In this way, the first access network device may page the terminal device and configure the SRS for the terminal device. Further, after the first access network device configures the SRS for the terminal device, the first access network device may release the terminal device as soon as possible, so that the terminal device enters or is in inactive state, to avoid energy consumption of the terminal device.

In another possible implementation, before the source access network device sends the positioning information failure message to the positioning device, the method further includes: The source access network device receives a UE context release message from the first access network device.

In this possible implementation, after the source access network device receives the UE context release message for the terminal device from the first access network device, the source access network device may determine that the terminal device has accessed the first access network device. The source access network device sends the positioning information failure message to the positioning device. This ensures that the terminal device has entered a connected state when the positioning device requests to configure the SRS for the terminal device again. In this case, the positioning device may successfully request the first access network device to request configuration of the SRS for the terminal device, so that the positioning device subsequently positions the terminal device.

A seventh aspect of embodiments of this application provides a communication apparatus. The communication apparatus includes:

a sending unit, configured to send a retrieve UE context request message to a source access network device;

a receiving unit, configured to receive a retrieve UE context response message from the source access network device, where the retrieve UE context response message includes reference information used to configure an SRS of a terminal device, and/or information used to indicate to configure the SRS for the terminal device, and the terminal device is in inactive state; and a processing unit, configured to determine SRS configuration information of the terminal device based on the reference information and/or the information used to indicate to configure the SRS for the terminal device, where the sending unit is further configured to send the SRS configuration information to the terminal device via a first access network device.

In a possible implementation, the reference information includes information about a sounding reference signal transmission characteristic, and the information about the sounding reference signal transmission characteristic includes at least one of the following: a sending periodicity, bandwidth, or transmission frequency that is of the SRS configured for the terminal device and that is recommended by a positioning device.

In another possible implementation, the retrieve UE context response message includes a routing identifier, and the routing identifier identifies the positioning device.

In another possible implementation, the retrieve UE context request message includes any one of the following: first information or second information. The first information is used to request the reference information. The second information is used to request positioning information of the terminal device.

In another possible implementation, the receiving unit is further configured to:

receive a paging message from the source access network device, where the paging message includes at least one of the following: third information, the reference information, fourth information, or fifth information, the third information is used to indicate that the paging message is used to position the terminal device, the fourth information is used to request the positioning information of the terminal device, and the fifth information is used to request to configure the SRS for the terminal device.

In another possible implementation, the paging message further includes the routing identifier, and the routing identifier identifies the positioning device.

In another possible implementation, the sending unit is specifically configured to:

send an RRC release message to the terminal device, where the RRC release message includes the SRS configuration information.

In another possible implementation, the sending unit is further configured to:

send a UE context release message to the source access network device, where the UE context release message includes the SRS configuration information.

An eighth aspect of embodiments of this application provides a communication apparatus. The communication apparatus includes:

a receiving unit, configured to receive a retrieve UE context request message sent by a first access network device; and a sending unit, configured to send a retrieve UE context response message to the first access network device, where the retrieve UE context response message includes reference information used to configure a sounding reference signal SRS of a terminal device, and/or information used to indicate to configure the SRS for the terminal device, and the terminal device is in inactive state.

In a possible implementation, the reference information includes information about a sounding reference signal transmission characteristic, and the information about the sounding reference signal transmission characteristic includes at least one of the following: a sending periodicity, bandwidth, or transmission frequency that is of the SRS configured for the terminal device and that is recommended by a positioning device.

In another possible implementation, the retrieve UE context response message includes a routing identifier, and the routing identifier identifies the positioning device.

In another possible implementation, the retrieve UE context request message includes any one of the following: first information or second information. The first information is used to request the reference information. The second information is used to request positioning information of the terminal device.

In another possible implementation, the sending unit is further configured to:

send a paging message to the first access network device, where the paging message includes any one of the following: third information, the reference information, fourth information, or fifth information, the third information is used to indicate that the paging message is used to position the terminal device, the fourth information is used to request the positioning information of the terminal device, and the fifth information is used to request to configure the SRS for the terminal device.

In another possible implementation, the receiving unit is further configured to:

receive a UE context release message from the first access network device, where the UE context release message includes SRS configuration information; and the sending unit is further configured to:

send the SRS configuration information to the positioning device.

A ninth aspect of embodiments of this application provides a communication apparatus. The communication apparatus includes:

a sending unit, configured to send an RRC resume request message to a first access network device; and a receiving unit, configured to receive an RRC release message from the first access network device, where the RRC release message includes SRS configuration information, and the SRS configuration information is determined by the first access network device based on reference information used to configure an SRS of a terminal device.

In a possible implementation, the reference information includes information about a sounding reference signal transmission characteristic, and the information about the sounding reference signal transmission characteristic includes at least one of the following: a sending periodicity or bandwidth that is of the SRS configured for the terminal device and that is recommended by a positioning device.

A tenth aspect of embodiments of this application provides a communication apparatus. The communication apparatus includes:

a sending unit, configured to send a positioning information request message to an access network device; and a receiving unit, configured to receive a positioning information response message from the access network device, where the positioning information response message includes at least one of the following:

information indicating that the positioning device re-requests to configure an SRS for a terminal device, where the terminal device is in inactive state;

information indicating that a terminal device has left the access network device, where the terminal device is in inactive state;

information indicating that a terminal device has left a cell managed by the access network device, where the terminal device is in inactive state; or information indicating that a terminal device in inactive state has left the access network device.

An eleventh aspect of embodiments of this application provides a communication apparatus. The communication apparatus includes:

a sending unit, configured to send a positioning information request message to an access network device; and a receiving unit, configured to receive a positioning information failure message from the access network device, where the positioning information failure message includes a cause, where the cause is used to indicate that a terminal device has left the access network device, where the terminal device is in inactive state;

the cause is used to indicate that a terminal device has left a cell managed by the access network device, where the terminal device is in inactive state; or the cause is used to indicate that a terminal device in inactive state has left the access network device.

A twelfth aspect of embodiments of this application provides a communication apparatus. The communication apparatus includes:

a receiving unit, configured to receive a positioning information request message from a positioning device; and a sending unit, configured to send a positioning information response message to the positioning device, where the positioning information response message includes at least one of the following:

information indicating that the positioning device re-requests to configure a sounding reference signal SRS for a terminal device, where the terminal device is in inactive state;

information indicating that a terminal device has left a source access network device, where the terminal device is in inactive state;

information indicating that a terminal device has left a cell managed by a source access network device, where the terminal device is in inactive state; or Information indicating that a terminal device in inactive state has left a source access network device.

In a possible implementation, the sending unit is further configured to:

send a paging message to a first access network device, where the paging message includes at least one of the following: first information, second information, or third information, the first information is used to indicate that the paging message is used to position the terminal device, the second information is used to request positioning information of the terminal device, and the third information is used to request to configure the SRS for the terminal device.

In another possible implementation, the receiving unit is further configured to:

receive a UE context release message from the first access network device.

A thirteenth aspect of embodiments of this application provides a communication apparatus. The communication apparatus includes:

a receiving unit, configured to receive a positioning information request message from a positioning device; and a sending unit, configured to send a positioning information failure message to the positioning device, where the positioning information failure message includes a cause, where the cause is used to indicate that a terminal device has left a source access network device, where the terminal device is in inactive state;

the cause is used to indicate that a terminal device has left a cell managed by a source access network device, where the terminal device is in inactive state; or the cause is used to indicate that a terminal device in inactive state has left a source access network device.

In a possible implementation, the sending unit is further configured to:

send a paging message to a first access network device, where the paging message includes at least one of the following: first information, second information, or third information, the first information is used to indicate that the paging message is used to position the terminal device, the second information is used to request positioning information of the terminal device, and the third information is used to request to configure an SRS for the terminal device.

In another possible implementation, the receiving unit is further configured to:

receive a UE context release message from the first access network device.

A fourteenth aspect of embodiments of this application provides a communication apparatus. The communication apparatus includes a processor, a memory, and a transceiver connected to the processor. The memory stores a computer program or computer instructions. The processor is further configured to invoke and run the computer program or the computer instructions stored in the memory, to enable the processor to implement any implementation in any one of the first aspect to the sixth aspect.

Optionally, the processor is configured to control the transceiver to perform any implementation in any one of the first aspect to the sixth aspect.

A fifteenth aspect of embodiments of this application provides a computer program product including instructions. When the computer program product runs on a computer, the computer is enabled to perform any implementation in any one of the first aspect to the sixth aspect.

A sixteenth aspect of embodiments of this application provides a computer-readable storage medium, including computer instructions. When the computer instructions are run on a computer, the computer is enabled to perform any implementation in any one of the first aspect to the sixth aspect.

A seventeenth aspect of embodiments of this application provides a communication apparatus. The communication apparatus includes an entity, for example, a network device, a terminal device, or a chip. The communication apparatus includes a processor, configured to invoke a computer program or computer instructions in a memory, to enable the processor to perform any implementation in any one of the first aspect to the sixth aspect.

Optionally, the processor is coupled to the memory through an interface.

An eighteenth aspect of embodiments of this application provides a communication system. The communication system includes the communication apparatus according to the seventh aspect and the communication apparatus according to the eighth aspect; the communication system includes the communication apparatus according to the tenth aspect and the communication apparatus according to the twelfth aspect; o the communication system includes the communication apparatus according to the eleventh aspect and the communication apparatus according to the thirteenth aspect.

It may be learned from the foregoing technical solutions that embodiments of this application have the following advantages:

It may be learned from the foregoing technical solutions that the first access network device sends the retrieve UE context request message to the source access network device. Then, the first access network device receives the retrieve UE context response message from the source access network device. The retrieve UE context response message includes the reference information used to configure the SRS of the terminal device. The terminal device is in inactive state. The first access network device determines the SRS configuration information of the terminal device based on the reference information. The first access network device sends the SRS configuration information to the terminal device. It may be learned that the terminal device is in inactive state. The first access network device may obtain, in the process of requesting the context of the terminal device from the source access network device, the reference information used to configure the SRS of the terminal device. Then, the first access network device determines the SRS configuration information of the terminal device based on the reference information used to configure the SRS of the terminal device. The first access network device sends the SRS configuration information to the terminal device, to configure the SRS for the terminal device. In this way, when the terminal device is in inactive state, the positioning device may successfully request to configure the SRS for the terminal device, so that the positioning device positions the terminal device. In other words, the technical solutions of embodiments of this application avoid a problem that the positioning device fails to position the terminal device because the positioning device fails to request to configure the SRS for the terminal device.

DESCRIPTION OF EMBODIMENTS

The following clearly and completely describes technical solutions in embodiments of this application with reference to the accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

The term "and/or" in this application describes only an association relationship for describing associated objects and represents that three relationships may exist. For example, A and/or B may represent the following three cases: Only A exists, both A and B exist, and only B exists. In addition, the character "/" in this application usually indicates an "or" relationship between the associated objects.

Figure 1:
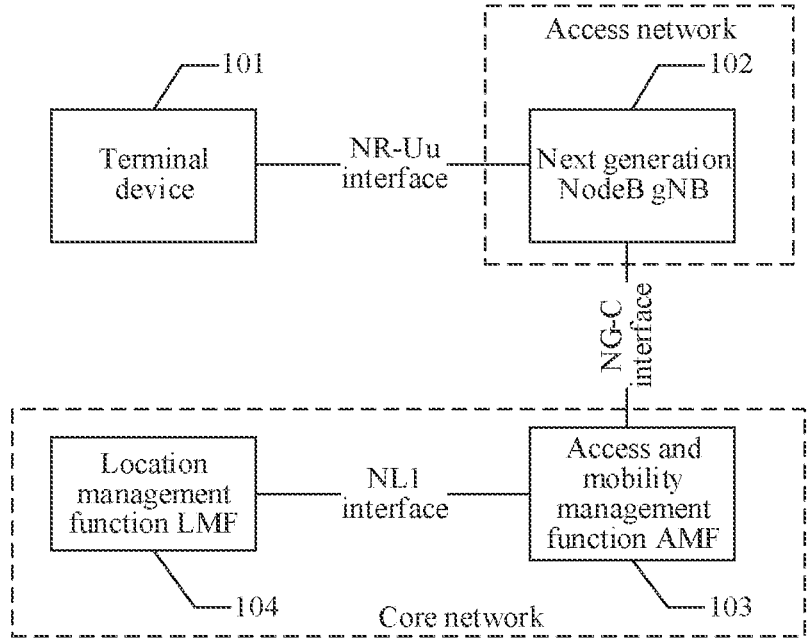
FIG. 1 is a schematic diagram of a communication system according to an embodiment of this application.

FIG. 1 is a schematic diagram of a communication system according to an embodiment of this application. The communication system includes a terminal device 101, a next generation NodeB (next Generation NodeB, gNB) 102, an access and mobility management function (access and mobility management function, AMF) 103, and a location management function (location management function, LMF) device 104.

The terminal device 101 is connected to the gNB 102 in an access network through an NR-Uu interface. In the communication system shown in FIG. 1, a core network includes the AMF 103 and the LMF 104. The gNB 102 communicates with the AMF 103 through an NG-C interface. The AMF 103 communicates with the LMF 104 through an NL1 interface, and the AMF 103 is equivalent to a router for communication between the gNB 102 and the LMF 104. The LMF 104 is configured to perform positioning calculation and management on a location of the terminal device 101.

FIG. 1 shows only an example in which the communication system includes the gNB 102. During actual application, the communication system may further include more base stations, or the communication system includes only one base station. This is not specifically limited in this application.

The following describes the access network device and the terminal device of the communication system provided in the embodiments of this application.

The gNB 102 is an access network device in the access network. The access network device is an apparatus deployed in a radio access network for providing a wireless communication function for the terminal device. The access network device is a base station, and the base station is a macro base station, a micro base station (also referred to as a small cell), a relay station, an access point (access point, AP), a wearable device, a vehicle-mounted device, and the like in various forms. Alternatively, the base station may be a transmission reception point (Transmission Reception Point, TRP), a transmission measurement function (Transmission measurement function, TMF), or the like. For example, the base station in embodiments of this application may be a base station in new radio (new radio, NR). The base station in 5G NR may also be referred to as a transmission reception point (transmission reception point, TRP), a transmission point (transmission point, TP), or a next generation NodeB (next generation NodeB, ngNB) shown in FIG. 1, or may be an evolved NodeB (evolved NodeB, eNB or eNodeB) in the long term evolution (long term evolution, LTE) system shown in FIG. 1.

The terminal device, also referred to as user equipment (user equipment, UE), a mobile station (mobile station, MS), a mobile terminal (mobile terminal, MT), or the like, is a device including a wireless communication function (providing voice/data connectivity to a user), for example, a handheld device or a vehicle-mounted device that has a wireless connection function. Currently, for example, the terminal device may be a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

The AMF 103 is responsible for access control, registration management, service management, mobility management, and the like for the terminal device to access a network.

In embodiments of this application, a name of the AMF 103 may change as the communication system evolves. In an existing communication system or a future communication system, any function network element that has another name and that has a function similar to that of the AMF 103 may be understood as the AMF 103 in embodiments of this application, and is applicable to a communication method provided in embodiments of this application.

In embodiments of this application, the LMF device is a name in the existing communication system. In the future communication system, the name of the LMF device may change as the communication system evolves. Therefore, the LMF device is referred to as a positioning device in the following descriptions to describe embodiments of this application. The positioning device is configured to perform positioning calculation on a location of the terminal device. In the existing communication system or the future communication system, a function network element that has another name and that has a function similar to that of the positioning device may be understood as the positioning device in embodiments of this application, and is applicable to the communication method provided in embodiments of this application.

Currently, in an uplink positioning technology, the positioning device requests a last serving access network device (last serving RAN) of the terminal device to configure an SRS for the terminal device. The terminal device is in inactive (inactive) state. The last serving access network device responds to the SRS configuration request of the positioning device. The last serving access network device configures SRS configuration information of the terminal device for the terminal device, and sends the SRS configuration information to the positioning device, so that the positioning device positions the terminal device.

However, the terminal device is in inactive state. When the terminal device moves from the last serving access network device to another new access network device, the positioning device still requests the last serving access network device to configure the SRS for the terminal device. The terminal device moves from the last serving access network device to the another new access network device. The last serving access network device cannot configure the SRS for the terminal device. As a result, the positioning device fails to request to configure the SRS for the terminal device, or the positioning device considers that the SRS cannot be configured for the terminal device. Consequently, the positioning device fails to position the terminal device.

In view of this, embodiments of this application provide a communication method, to resolve a problem that the positioning device fails to request to configure the SRS for the terminal device when the terminal device is in inactive state, so that the positioning device positions the terminal device. For details, refer to related descriptions of the embodiments shown in FIG. 2A, FIG. 3, and FIG. 4.

The following describes the technical solutions of this application with reference to specific embodiments.

Figure 2A:
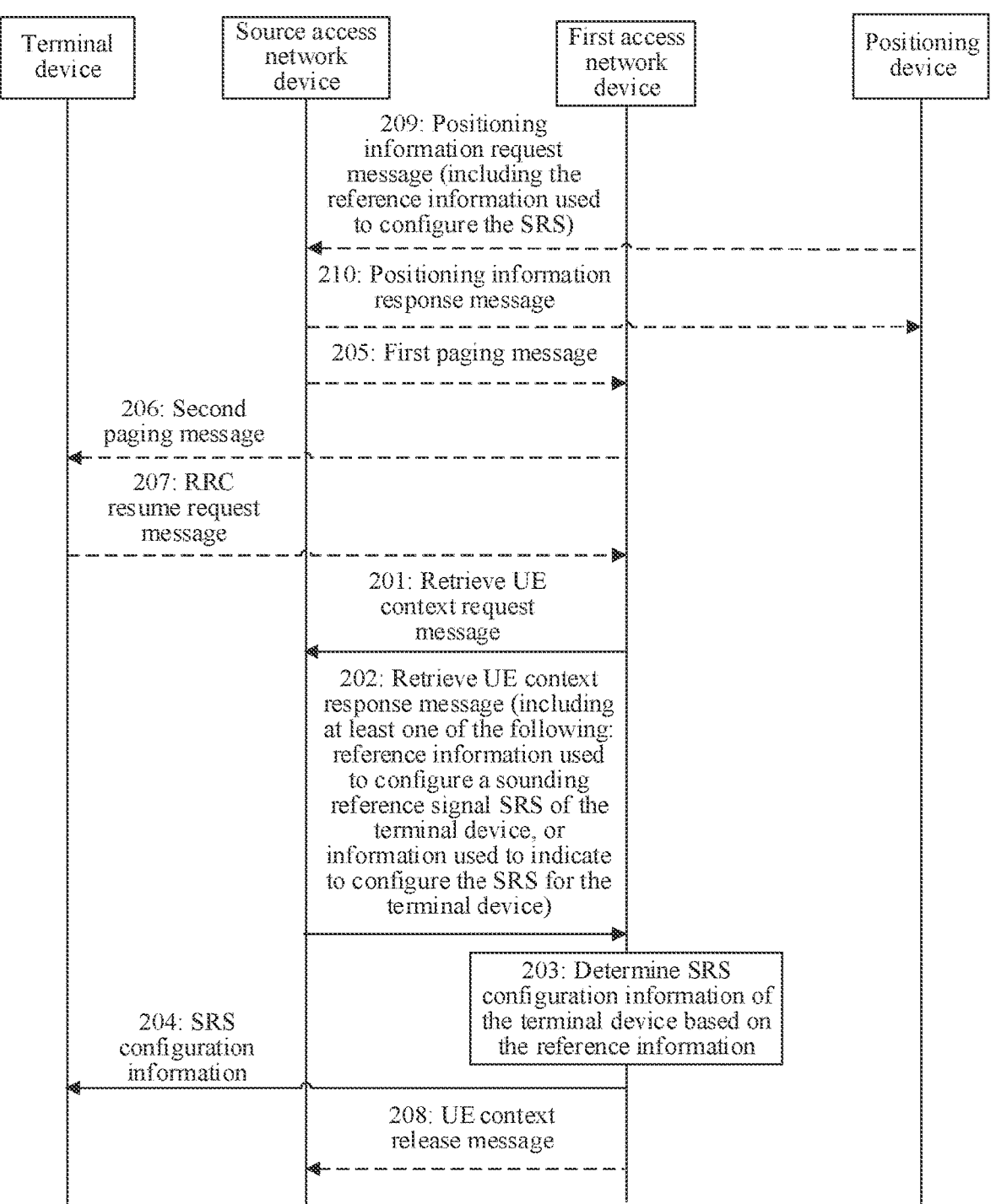
FIG. 2A is a schematic diagram of an embodiment of a communication method according to embodiments of this application.

FIG. 2A is a schematic diagram of an embodiment of a communication method according to embodiments of this application. In FIG. 2A, the communication method includes the following steps.

201: A first access network device sends a retrieve UE context request (retrieve UE context request) message to a source access network device. Correspondingly, the source access network device receives the retrieve UE context request message from the first access network device.

The retrieve UE context request message is used to request a context of a terminal device. The terminal device is in inactive (inactive) state.

The terminal device is in inactive state. When the terminal device moves from a signal coverage area of the source access network device to a signal coverage area of the first access network device, that is, the terminal device camps on the first access network device, the first access network device may be referred to as a camped access network device (camped RAN) of the terminal device. The source access network device is a last access network device serving the terminal device. The source access network device stores a context of the terminal device and an NG connection that is associated with the terminal device and that is between the source access network device and an AMF. The source access network device may be referred to as a last serving access network device (last serving RAN)

of the terminal device. The first access network device requests the context of the terminal device from the source access network device.

Optionally, the retrieve UE context request message includes at least one of the following: first information or second information.

The first information is used to request reference information used to configure an SRS of the terminal device. For related descriptions of the reference information used to configure the SRS of the terminal device, refer to the related descriptions in step 202 below. Details are not described herein.

The second information is used to request positioning information of the terminal device.

For example, the first information includes an information element in the retrieve UE context request message. The first access network device requests, by using the information element in the retrieve UE context request message, the reference information used to configure the SRS of the terminal device.

For example, the first information includes an information element of SRS information (SRS information). The first access network device requests, by using the information element of the SRS information, the reference information used to configure the SRS of the terminal device.

For example, the first information includes indication information. The first access network device requests, by using the indication information, the reference information used to configure the SRS of the terminal device.

For example, when a value of the indication information is "true (true)", it indicates that the indication information is used to request the reference information for configuring the SRS of the terminal device. For example, when the value of the indication information is "1", it indicates that the indication information is used to request the reference information for configuring the SRS of the terminal device.

In this embodiment, the first information may explicitly or implicitly indicate to request the reference information used to configure the SRS of the terminal device. This is not specifically limited in this application.

In this embodiment, the first information may directly or indirectly indicate to request the reference information used to configure the SRS of the terminal device. This is not specifically limited in this application.

For example, the second information includes an information element in the retrieve UE context request message. The first access network device requests the positioning information of the terminal device by using the information element in the retrieve UE context request message.

For example, the second information includes an information element of the positioning information (positioning information). The first access network device requests the positioning information of the terminal device by using the information element of the positioning information.

For example, the second information includes indication information. The first access network device requests the positioning information of the terminal device by using the indication information.

For example, when a value of the indication information is "true (true)", it indicates that the indication information is used to request the positioning information of the terminal device. For example, when the value of indication information is "1", it indicates that the indication information is used to request the positioning information of the terminal device.

In this embodiment, the second information may explicitly or implicitly indicate to request the positioning information of the terminal device. This is not specifically limited in this application.

In this embodiment, the second information may directly or indirectly indicate to request the positioning information of the terminal device. This is not specifically limited in this application.

202: The source access network device sends a retrieve UE context response (retrieve UE context response) message to the first access network device. Correspondingly, the first access network device receives the retrieve UE context response message from the source access network device.

The retrieve UE context response message includes at least one of the following: the reference information used to configure the SRS of the terminal device, or information used to indicate to configure the SRS for the terminal device.

For example, the reference information includes at least one of the following: a recommended sending periodicity, bandwidth, or transmission frequency of the SRS configured for the terminal device.

Optionally, the reference information includes information about a sounding reference signal transmission characteristic (SRS transmission characteristic).

A positioning device sends a positioning information request message to the source access network device. The positioning information request message is used to request to configure the SRS for the terminal device. The positioning device may be an LMF device.

In a possible implementation, if the positioning information request message does not include a sounding reference signal transmission characteristic information element, the source access network device determines the information used to indicate to configure the SRS for the terminal device. Then, the source access network device sends, to the first access network device by using the retrieve UE context response message, the information used to indicate to configure the SRS for the terminal device.

In another possible implementation, if the positioning information request message includes the sounding reference signal transmission characteristic information element, the source access network device determines the information about the sounding reference signal transmission characteristic based on the sounding reference signal transmission characteristic information element. Then, the source access network device sends, to the first access network device by using the retrieve UE context response message, the information about the sounding reference signal transmission characteristic.

Optionally, in this implementation, the source access network device may further determine information used to indicate the terminal device to configure the SRS. Then, the source access network device sends, to the first access network device by using the retrieve UE context response message, the information used to indicate the terminal device to configure the SRS.

In another possible implementation, if the positioning information request message includes the sounding reference signal transmission characteristic information element, the source access network device determines the information used to indicate the terminal device to configure the SRS. Then, the source access network device sends, to the first access network device by using the retrieve UE context response message, the information used to indicate the terminal device to configure the SRS.

Optionally, a relationship between the information about the sounding reference signal transmission characteristic and content of the sounding reference signal transmission characteristic information element included in the positioning information request message includes any one of the following:

1. The information about the sounding reference signal transmission characteristic includes all content of the sounding reference signal transmission characteristic information element included in the positioning information request message.

For example, the sounding reference signal transmission characteristic information element includes: the sending periodicity and the bandwidth that are of the SRS configured for the terminal device and that are recommended by the positioning device. The information about the sounding reference signal transmission characteristic includes: the sending periodicity and the bandwidth that are of the SRS configured for the terminal device and that are recommended by the positioning device.

2. The information about the sounding reference signal transmission characteristic includes a part of content of the sounding reference signal transmission characteristic information element included in the positioning information request message.

For example, the sounding reference signal transmission characteristic information element includes: the sending periodicity and the bandwidth that are of the SRS configured for the terminal device and that are recommended by the positioning device. The information about the sounding reference signal transmission characteristic includes the sending periodicity that is of the SRS configured for the terminal device and that is recommended by the positioning device.

3. The information about the sounding reference signal transmission characteristic includes: a part of content of the sounding reference signal transmission characteristic information element included in the positioning information request message and new content.

For example, the sounding reference signal transmission characteristic information element includes: the sending periodicity and the bandwidth that are of the SRS configured for the terminal device and that are recommended by the positioning device. The information about the sounding reference signal transmission characteristic includes: the sending periodicity and the bandwidth that are of the SRS configured for the terminal device and that are recommended by the positioning device, and a transmission frequency that is of the SRS configured for the terminal device and that is recommended by the source access network device.

4. The information about the sounding reference signal transmission characteristic includes: information obtained by the source access network device by changing the content of the sounding reference signal transmission characteristic information element.

For example, the sounding reference signal transmission characteristic information element includes: an SRS sending periodicity A recommended by the positioning device and bandwidth B. The source access network device changes the SRS sending periodicity to C, and changes the bandwidth to D. The information about the sounding reference signal transmission characteristic includes: the sending periodicity C that is recommended by the source access network device and that is of the SRS configured for the terminal device and the bandwidth D. A, B, C, and D are all greater than 0.

The foregoing shows only several possible relationships between the information about the sounding reference signal transmission characteristic and the content of the sounding reference signal transmission characteristic information element, and does not constitute a limitation on this application. Another possible relationship is also applicable to this application.

In this embodiment, the information about the sounding reference signal transmission characteristic may be represented in a form of an information element. For example, the information about the sounding reference signal transmission characteristic includes the sounding reference signal transmission characteristic information element.

For example, the information used to indicate to configure the SRS for the terminal device includes an information element of the retrieve UE context response message.

For example, the information used to indicate to configure the SRS for the terminal device includes an SRS requested (SRS required, or SRS requested) information element, an SRS configuration requested (SRS configuration required, or SRS configuration requested) information element, a positioning information requested (positioning information required, or positioning information requested) information element, and the like.

For example, the information used to indicate to configure the SRS for the terminal device includes indication information.

For example, when a value of the indication information is "true (true), it indicates that the indication information is used to indicate to configure the SRS for the terminal device. For another example, when the value of the indication information is "1", it indicates that the indication information is used to indicate to configure the SRS for the terminal device.

In this embodiment, the information used to indicate to configure the SRS for the terminal device may explicitly indicate to configure the SRS for the terminal device. For example, the source access network device explicitly indicates, by using the indication information included in the retrieve context response message, the first access network device to configure the SRS for the terminal device.

In this embodiment, the information used to indicate to configure the SRS for the terminal device may implicitly indicate to configure the SRS for the terminal device. For example, the source access network device implicitly indicates, by using the sounding reference signal transmission characteristic information element included in the retrieve context response message, the first access network device to configure the SRS for the terminal device.

In this embodiment, the information used to indicate to configure the SRS for the terminal device may directly indicate to configure the SRS for the terminal device. For example, the source access network device directly indicates, by using the indication information in the retrieve context response message, the first access network device to configure the SRS for the terminal device.

In this embodiment, the information used to indicate to configure the SRS for the terminal device may indirectly indicate to configure the SRS for the terminal device. For example, the source access network device indirectly indicates, by using the sounding reference signal transmission characteristic information element included in the retrieve context response message, the first access network device to configure the SRS for the terminal device.

Optionally, the retrieve UE context response message further includes a routing identifier (routing ID). The routing identifier identifies the positioning device.

Specifically, the routing identifier is sent by a core network device (for example, the AMF) in a core network to the source access network device. The routing identifier is used by the core network device to identify the positioning device. The positioning device may be an LMF device. After the first access network device obtains the routing identifier, the first access network device determines SRS configuration information of the terminal device. Then, the first access network device may send the SRS configuration information of the terminal device to the positioning device via the core network device. The first access network device includes the routing identifier in a message used to send the SRS configuration information. The core network device identifies, based on the routing identifier, the positioning device corresponding to the routing identifier, and forwards, to the positioning device, the SRS configuration sent by the first access network device to the positioning device.

In this embodiment, the routing identifier includes a routing identifier information element in the retrieve UE context response message.

203: The first access network device determines the SRS configuration information of the terminal device based on the reference information used to configure the SRS of the terminal device and/or the information used to indicate to configure the SRS for the terminal device.

Optionally, the SRS configuration information includes at least one of the following: a sending periodicity, bandwidth, or a transmission frequency that is of the SRS configured by the first access network device for the terminal device.

In a possible implementation, the retrieve UE context response message includes the reference information used to configure the SRS of the terminal device. The first access network device determines the SRS configuration information of the terminal device based on the reference information used to configure the SRS of the terminal device. In this implementation, if the retrieve UE context response message further includes the information used to indicate to configure the SRS for the terminal device, the first access network device may determine, based on the information used to indicate to configure the SRS for the terminal device, to configure the SRS for the terminal device. Then, the first access network device determines the SRS configuration information of the terminal device in combination with the reference information used to configure the SRS of the terminal device.

For example, the reference information includes a recommended sending periodicity, bandwidth, transmission frequency, or the like of the SRS configured for the terminal device. The first access network device may determine the sending periodicity, bandwidth, transmission frequency, or the like of the SRS of the terminal device based on the reference information, that is, determine the SRS configuration information of the terminal device. The sending periodicity, bandwidth, and transmission frequency that are of the SRS configured by the first access network device for the terminal device are respectively the same as or different from the sending periodicity, bandwidth, and transmission frequency that are recommended in the reference information. This is not specifically limited in this application.

In another possible manner, the retrieve UE context response message includes the information used to indicate to configure the SRS for the terminal device. The first access network device determines, based on the information used to indicate to configure the SRS for the terminal device, to configure the SRS for the terminal device. Then, the first access network device determines the SRS configuration information for the terminal device.

204: The first access network device sends the SRS configuration information to the terminal device. Correspondingly, the terminal device receives the SRS configuration information from the first access network device.

In step 204, the first access network device sends the SRS configuration information to the terminal device in a plurality of manners. For details, refer to the related descriptions in FIG. 2B below. Details are not described herein.

After the terminal device receives the SRS configuration information of the terminal device, the terminal device sends the SRS based on the SRS configuration information. The positioning device obtains the SRS configuration information of the terminal device. The positioning device may select a measurement access network device, and measure, by using the measurement access network device, the SRS sent by the terminal device. Then, the measurement access network device reports a measurement result to the positioning device. The positioning device positions the terminal device based on the measurement result.

Optionally, this embodiment may further include step 205 to step 207. Step 205 to step 207 are performed before step 201.

205: The source access network device sends a first paging (RAN paging) message to the first access network device. Correspondingly, the first access network device receives the first paging message from the source access network device.

Specifically, the source access network device sends the first paging message to a plurality of access network devices within a paging area of an access network, to indicate the plurality of access network devices to page the terminal device. The plurality of access network devices include the first access network device.

Optionally, the first paging message includes at least one of the following: third information, the reference information, fourth information, or fifth information.

The third information is used to indicate that the paging message is used to position the terminal device.

The fourth information is used to request the positioning information of the terminal device.

The fifth information is used to request to configure the SRS for the terminal device.

For related descriptions of the reference information, refer to the related descriptions in step 202.

For example, the third information includes an information element in the first paging message.

For example, the third information includes a positioning (positioning) information element, a paging purpose (paging purpose) information element, or a paging cause (paging cause) information element. For example, a value of the paging purpose information element is positioning. A value of the paging cause information element is positioning.

For example, the third information includes indication information.

For example, when the indication information is "true", it indicates that the paging message is used to position the terminal device. Alternatively, when the indication information is "1", it indicates that the paging message is used to position the terminal device.

It can be learned from the foregoing examples of the third information that, in this embodiment, the third information may explicitly or implicitly indicate that the paging message is used to position the terminal device. This is not specifically limited in this application.

It can be learned from the foregoing examples of the third information that, in this embodiment, the third information may directly or indirectly indicate that the paging message is used to position the terminal device. This is not specifically limited in this application.

For example, the fourth information includes an information element in the first paging message.

For example, the fourth information includes a positioning information (positioning information) information element, a paging purpose (paging purpose) information element, or a paging cause (paging cause) information element. For example, a value of the paging purpose information element is the positioning information. A value of the paging cause information element is the positioning information.

For example, the fourth information includes indication information.

For example, when the indication information is "true", it indicates that the positioning information of the terminal device is requested. Alternatively, when the indication information is "1", it indicates that the positioning information of the terminal device is requested.

It can be learned from the foregoing examples of the fourth information that, in this embodiment, the fourth information may explicitly or implicitly indicate that the positioning information of the terminal device is requested. This is not specifically limited in this application.

It can be learned from the foregoing examples of the fourth information that, in this embodiment, the fourth information may directly or indirectly indicate to request the positioning information of the terminal device. This is not specifically limited in this application.

For example, the fifth information includes an information element in the first paging message.

For example, the fifth information includes an SRS requested (SRS required, or SRS requested) information element, an SRS configuration requested (SRS configuration required, SRS configuration requested) information element, a positioning information requested (positioning information required, positioning information requested) information element, a paging purpose (paging purpose) information element, a paging cause (paging cause) information element, or the like. For example, a value of the paging purpose information element is any one of the following: configuring the SRS, requesting the SRS, or requesting to configure the SRS. A value of the paging cause information element is any one of the following: configuring the SRS, requesting the SRS, or requesting to configure the SRS.

For example, the fifth information includes indication information.

For example, when the indication information is "true", it indicates that configuration of the SRS for the terminal device is requested. Alternatively, when the indication information is "1", it indicates that configuration of the SRS for the terminal device is requested.

It can be learned from the foregoing examples of the fifth information that, in this embodiment, the fifth information may explicitly or implicitly indicate to request to configure the SRS for the terminal device. This is not specifically limited in this application.

It can be learned from the foregoing examples of the fifth information that, in this embodiment, the fifth information may directly or indirectly indicate to request to configure the SRS for the terminal device. This is not specifically limited in this application.

In this embodiment, only one of the retrieve UE context response message in step 202 and the first paging message in step 205 may include the reference information.

For example, the retrieve UE context response message in step 202 includes the reference information, and the first paging message in step 205 does not include the reference information. For another example, the retrieve UE context response message in step 202 does not include the reference information, and the first paging message in step 205 includes the reference information. Certainly, the retrieve UE context response message in step 202 and the first paging message in step 205 each may alternatively include the reference information. This is not specifically limited in this application.

Optionally, the first paging message further includes the routing identifier. The routing identifier identifies the positioning device. For related descriptions of the routing identifier, refer to the related descriptions in step 202.

In this embodiment, only one of the retrieve UE context response message in step 202 and the first paging message in step 205 may include the routing identifier.

For example, the retrieve UE context response message in step 202 includes the routing identifier, and the first paging message in step 205 may not include the routing identifier. For another example, the retrieve UE context response message in step 202 does not include the routing identifier, and the first paging message in step 205 includes the routing identifier. Certainly, the retrieve UE context response message in step 202 and the first paging message in step 205 each may alternatively include the routing identifier. This is not specifically limited in this application.

206: The first access network device sends a second paging (paging) message to the terminal device. Correspondingly, the terminal device receives the second paging message from the first access network device.

The second paging message includes an identifier of the terminal device, for example, a user equipment identity (user equipment identity, UE ID).

The first access network device determines, based on the first paging message in step 205, to page the terminal device. Then, the first access network device pages the terminal device by using the second paging message, to indicate the terminal device to initiate an RRC resume request to the first access network device, so that the terminal device accesses the network.

207: The terminal device sends an RRC resume request (RRC resume request) message to the first access network device. Correspondingly, the first access network device receives the RRC resume request message from the terminal device.

Figure 2B:
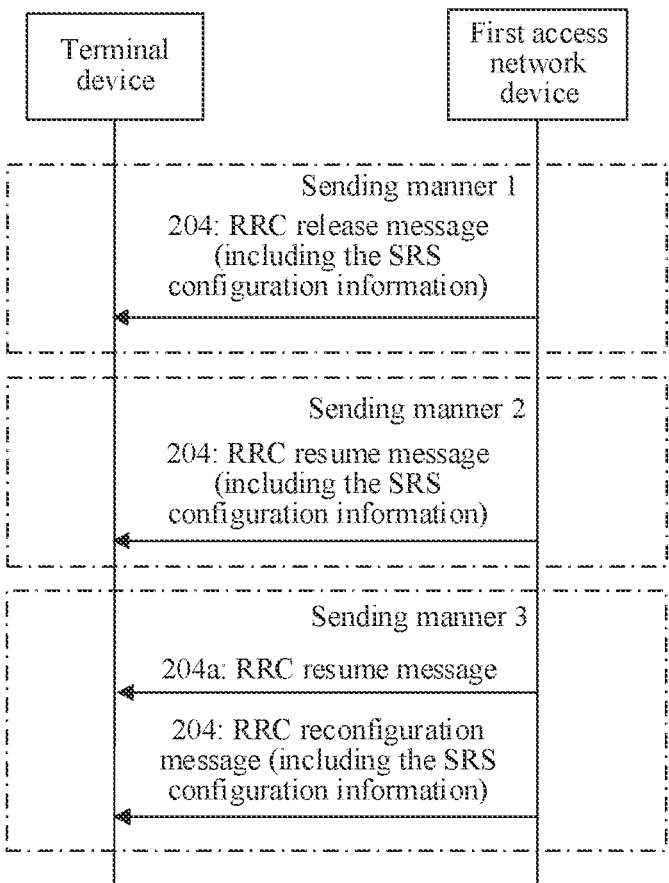
FIG. 2B is a schematic diagram of another embodiment of a communication method according to embodiments of this application.

The following describes several possible sending manners in which the first access network device sends the SRS configuration information of the terminal device in step 204 with reference to FIG. 2B.

Sending Manner 1

Refer to FIG. 2B. Step 204 specifically includes: The first access network device sends an RRC release (RRC release) message to the terminal device. The RRC release message includes the SRS configuration information. Correspondingly, the terminal device receives the RRC release message from the first access network device.

The terminal device initiates the RRC resume request to the first access network device in step 207. The first access network device pages the terminal device to position the terminal device or configure the SRS for the terminal device. The first access network device may send the RRC release message to the terminal device, so that the terminal device is in inactive state. This avoids energy consumption caused by the terminal device entering a connected state. In addition, the first access network device delivers the SRS configuration information to the terminal device in the RRC release message, to configure the SRS for the terminal device. In addition, a delay of delivering the SRS configuration information to the terminal device by the first access network device is reduced, to deliver the SRS configuration information to the terminal device earlier and more quickly. An extra delay caused by positioning of the terminal device is avoided, and positioning efficiency is improved.

Sending Manner 2

Refer to FIG. 2B. Step 204 specifically includes: The first access network device sends the RRC resume (RRC resume) message to the terminal device. The RRC resume message includes the SRS configuration information. Correspondingly, the terminal device receives the RRC resume message from the first access network device.

The terminal device initiates the RRC resume request to the first access network device in step 207. The first access network device receives the RRC resumption request of the terminal device, so that the terminal device enters a connected state. In addition, the first access network device delivers the SRS configuration information to the terminal device in the RRC resume message, to configure the SRS for the terminal device. In addition, a delay of delivering the SRS configuration information to the terminal device by the first access network device is reduced, to deliver the SRS configuration information to the terminal device earlier and more quickly. An extra delay caused by positioning of the terminal device is avoided, and positioning efficiency is improved.

Sending Manner 3

Refer to FIG. 2B. The embodiment shown in FIG. 2A further includes step 204a. Step 204a is performed after step 202, and step 204a is performed before step 204.

204a: The first access network device sends the RRC resume (RRC resume) message to the terminal device. Correspondingly, the terminal device receives the RRC resume message from the first access network device.

The terminal device initiates the RRC resume request to the first access network device in step 207, and the first access network device receives the RRC resume request of the terminal device, so that the terminal device enters the connected state.

Based on step 204a, step 204 specifically includes: The first access network device sends an RRC reconfiguration (RRC reconfigure) message to the terminal device. The RRC reconfiguration message includes the SRS configuration information. Correspondingly, the terminal device receives the RRC reconfiguration message from the first access network device.

In the sending manner 3, the first access network device receives the RRC resume request of the terminal device. Then, after the terminal device enters the connected state, the first access network device sends the SRS configuration information to the terminal device by using the RRC reconfiguration message, to configure the SRS for the terminal device.

Optionally, this embodiment further includes step 208.

For the sending manner 1 in FIG. 2B, step 208 is performed after step 204 in the sending manner 1 in FIG. 2B.

For the sending manner 2 in FIG. 2B, step 208 is performed after step 204 in the sending manner 2 in FIG. 2B.

For the sending manner 3 in FIG. 2B, step 208 is performed after step 204a in the sending manner 3 in FIG. 2B.

Step 208 and step 204 in the sending manner 3 in FIG. 2B may be performed in any sequence. For example, step 204 may be performed before step 208. Alternatively, step 208 is performed before step 204. Alternatively, step 204 and step 208 are simultaneously performed based on a situation. This is not specifically limited in this application.

208: The first access network device sends a UE context release (UE context release) message to the source access network device. Correspondingly, the source access network device receives the UE context release message from the first access network device.

In this embodiment, the source access network device may be determined based on the sounding reference signal transmission characteristic information element included in the positioning information request message sent by the positioning device. Descriptions are provided below with reference to step 209 and step 210. Step 209 and step 210 are performed before step 205.

209: The positioning device sends the positioning information request (positioning information request) message to the source access network device. Correspondingly, the source access network device receives the positioning information request message from the positioning device.

The positioning information request message is used to request to configure the SRS for the terminal device. The positioning information request message may include the sounding reference signal transmission characteristic information element. For related descriptions of the reference information, refer to the related descriptions in step 202. Details are not described herein again.

210: The source access network device sends a positioning information response (positioning information response) message to the positioning device. Correspondingly, the positioning device receives the positioning information response message from the source access network device.

The source access network device feeds back the positioning information response message to the positioning device. In this way, the positioning device does not consider that the SRS cannot be configured for the terminal device. In addition, the positioning device does not consider that the terminal device cannot be positioned. When the source access network device performs step 210, the first access network device has not configured the SRS for the terminal device, and the positioning information response message may not include the SRS configuration information of the terminal device. The SRS configuration information of the terminal device may be sent to the positioning device by using another message. For details, refer to related descriptions below in FIG. 2C.

Optionally, step 210 is performed after step 208.

In this embodiment of this application, the first access network device sends the retrieve UE context request message to the source access network device. Then, the first access network device receives the retrieve UE context response message from the source access network device. The retrieve UE context response message includes the reference information used to configure the SRS of the terminal device. The terminal device is in inactive state. The first access network device determines the SRS configuration information of the terminal device based on the reference information, and sends the SRS configuration information to the terminal device. It can be learned that the terminal device is in inactive state, the terminal device moves from the source access network device to the first access network device, and the first access network device may obtain, in a process of requesting a context of the terminal device, the reference information used to configure the SRS of the terminal device. Then, the first access network device determines the SRS configuration information of the terminal device based on the reference information used to configure the SRS of the terminal device. The first access network device sends the SRS configuration information to the terminal device, to configure the SRS of the terminal device. In this way, when the terminal device is in inactive state, the positioning device may successfully request to configure the SRS for the terminal device, so that the positioning device positions the terminal device. In other words, the technical solutions of embodiments of this application avoid a problem that the positioning device fails to position the terminal device because the positioning device fails to request to configure the SRS for the terminal device.

The embodiment shown in FIG. 2A shows step 201 to step 210. During actual application, not all of step 201 to step 210 need to be performed, and some or all of step 201 to step 210 may be performed based on a requirement.

In the embodiment shown in FIG. 2A, in order that the positioning device can position the terminal device, the positioning device obtains the SRS configuration information of the terminal device determined by the first access network device. The following shows several possible obtaining manners in which the positioning device obtains the SRS configuration of the terminal device. The following describes the manners with reference to FIG. 2C.

Obtaining Manner 1

In the obtaining manner 1, the retrieve UE context release message in step 208 in the embodiment shown in FIG. 2A includes the SRS configuration information. In addition, the embodiment shown in FIG. 2A further includes step 211, and step 211 is performed after step 208.

211: The source access network device sends the SRS configuration information to the positioning device. Correspondingly, the positioning device receives the SRS configuration information from the source access network device.

In a possible implementation, step 211 specifically includes: The source access network device sends a positioning information update (positioning information update) message to the positioning device. The positioning information update message includes the SRS configuration information. Correspondingly, the positioning device receives the positioning information update message from the source access network device.

In this implementation, the positioning device receives the positioning information update message of the source access network device. Then, the positioning device obtains the SRS configuration information of the terminal device by using the positioning information update message.

In another possible implementation, the SRS configuration information is included in the positioning information response message in step 210. That is, step 211 and step 210 are combined: The source access network device sends the positioning information response message to the positioning device, where the positioning information response message includes the SRS configuration information. Correspondingly, the positioning device receives the positioning information response message from the source access network device.

The source access network device obtains the SRS configuration information of the terminal device by using the retrieve UE context release message. Then, the source access network device reports the SRS configuration information to the positioning device by using the positioning information response message. That is, the positioning device obtains the SRS configuration information of the terminal device by using the positioning information response message.

Obtaining Manner 2

In the obtaining manner 2, the embodiment shown in FIG. 2A further includes step 212. Step 212 is performed after step 203.

Step 212: The first access network device sends the SRS configuration information to the positioning device. Correspondingly, the positioning device receives the SRS configuration information from the first access network device.

Optionally, step 212 specifically includes: The first access network device sends a positioning information update (positioning information update) message to the positioning device. The positioning information update message includes the SRS configuration information. The positioning device receives the positioning information update message from the first access network device.

In the obtaining manner 2, the positioning device receives the positioning information update message of the first access network device. The positioning device obtains the SRS configuration information of the terminal device by using the positioning information update message.

The foregoing shows a plurality of possible obtaining manners in which the positioning device obtains the SRS configuration information of the terminal device. After the positioning device obtains the SRS configuration information of the terminal device, the positioning device may select a plurality of measurement access network devices, and measure, by using the measurement access network devices, an SRS sent by the terminal device. Then, the measurement access network device reports a measurement result to the positioning device. In this case, the positioning device positions the terminal device based on the measurement result.

This application further provides an embodiment, and this embodiment is similar to the embodiment shown in FIG. 2A. A difference lies in that step 211 in the embodiment shown in FIG. 2A is replaced with: The source access network device sends a positioning information failure (positioning information failure) message to the positioning device. Correspondingly, the positioning device receives the positioning information failure message from the source access network device.

Optionally, the positioning information failure message includes a cause (cause). The cause is used to indicate that the terminal device has left the source access device; the cause is used to indicate that the terminal device has left a cell managed by the source access network device; the cause is used to indicate that the terminal device in inactive state has left the source access network device; or the cause is used to indicate that the terminal device in inactive state has left a cell managed by the source access network device. For related descriptions of the cause included in the positioning information failure message, refer to the related descriptions in step 402 in the embodiment shown in FIG. 4. Details are not described herein.

In this way, the positioning device does not consider that the SRS cannot be configured for the terminal device. In addition, the positioning device does not consider that the terminal device cannot be positioned. When the source access network device performs step 210, the first access network device has not configured the SRS for the terminal device, and the positioning information failure message may not include the SRS configuration information of the terminal device. The SRS configuration information of the terminal device may be sent to the positioning device by using another message. For details, refer to the related descriptions in FIG. 2C.

Optionally, the replaced step 211 is performed after step 209.

Figure 3:
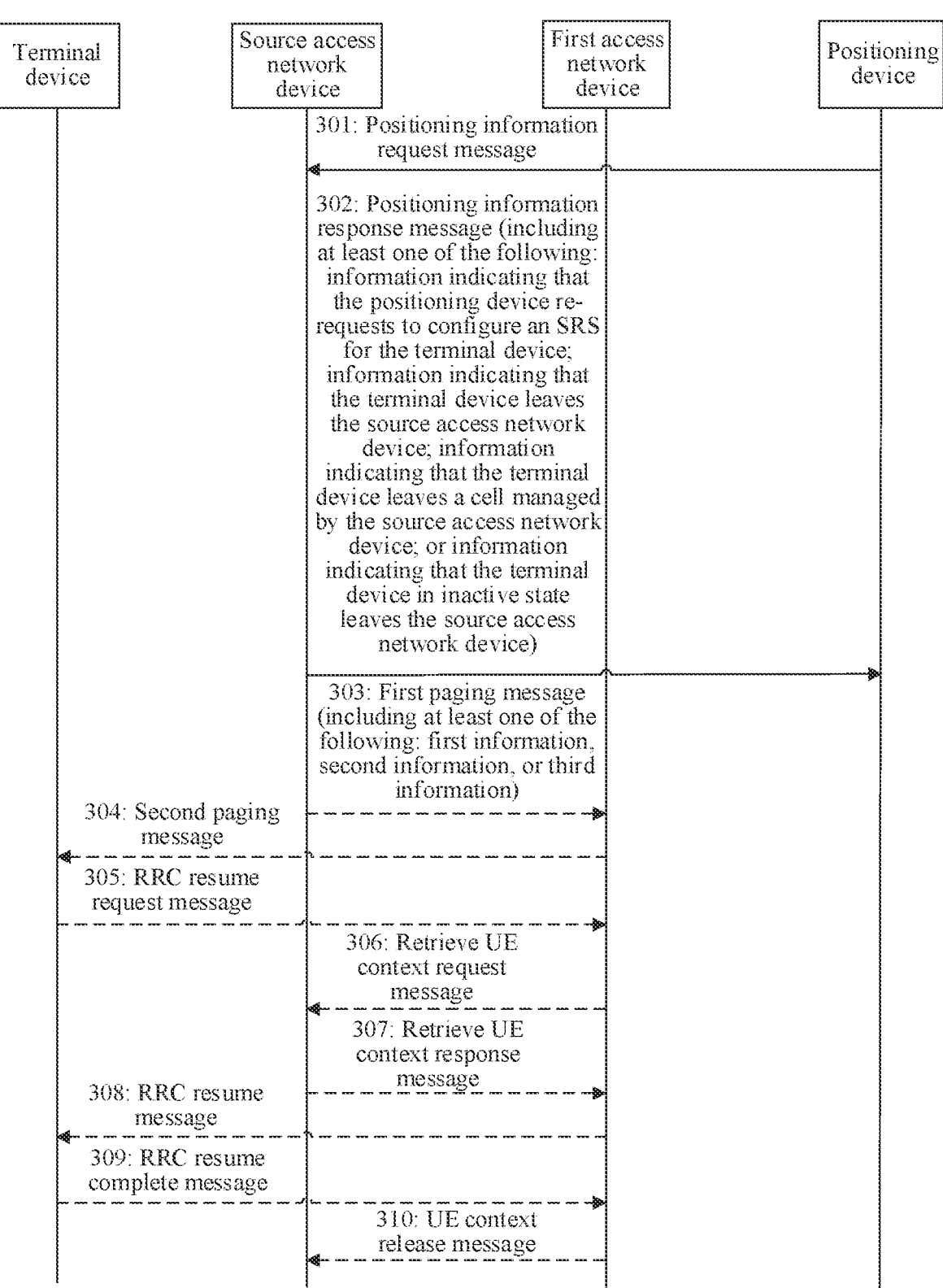
FIG. 3 is a schematic diagram of another embodiment of a communication method according to embodiments of this application.

FIG. 3 is a schematic diagram of another embodiment of a communication method according to embodiments of this application. In FIG. 3, the communication method includes the following steps.

301: A positioning device sends a positioning information request (positioning information request) message to a source access network device. Correspondingly, the source access network device receives the positioning information request message from the positioning device.

The positioning information request message is used to request to configure an SRS for a terminal device. The positioning information request message may include a sounding reference signal transmission characteristic information element. For details of related descriptions of the sounding reference signal transmission characteristic information element, refer to the related descriptions in step 202 in the embodiment shown in FIG. 2A. Details are not described herein again.

In this embodiment, the terminal device is in inactive state. The terminal device moves from a signal coverage area of the source access network device to a signal coverage area of a first access network device. That is, the terminal device camps on the first access network device, and the first access network device may be referred to as a camped access network device (camped RAN) of the terminal device. The source access network device is a last access network device serving the terminal device. The source access network device stores a context of the terminal device and an NG connection that is associated with the terminal device and that is between the source access network device and an AMF. The source access network device may be referred to as a last serving access network device (last serving RAN) of the terminal device.

302: The source access network device sends a positioning information response (positioning information response) message to the positioning device. Correspondingly, the positioning device receives the positioning information response message from the source access network device.

The positioning information response message includes at least one of the following information.

1. Information Indicating that the Positioning Device Re-Requests to Configure the SRS for the Terminal Device.

The re-requesting to configure the SRS for the terminal device includes: The positioning device re-requests a serving access network device of the terminal device to configure the SRS for the terminal device. The terminal device moves to the first access network device. If the terminal device accesses the first access network device, the first access network device is the serving access network device of the terminal device.

The positioning device sends the positioning information request message to the serving access network device of the terminal device via the AMF. To be specific, the AMF determines the serving access network device accessed by the terminal device, and sends the positioning information request message to the serving access network device. Therefore, the terminal device moves from the signal coverage area of the source access network device to the signal coverage area of the first access network device, and the terminal device accesses the first access network device. If the positioning device requests to configure the SRS for the terminal device again, only the AMF can detect that a serving access network device of the terminal device changes. The AMF selects the first access network device currently accessed by the terminal device, and sends, to the first access network device, the positioning device request message requested by the positioning device again. The positioning device does not know access network devices to which the positioning information request messages of the two requests are sent.

Therefore, for the positioning device, the source access network device may indicate the positioning device to re-request to configure the SRS for the terminal device. That is, the positioning device is indicated to re-request the serving access network device of the terminal device to configure the SRS for the terminal device.

For example, the information indicating that the positioning device re-requests to configure the SRS for the terminal device includes an information element in the positioning information response message.

For example, the information indicating that the positioning device re-requests to configure the SRS for the terminal device includes an SRS requested (SRS required, or SRS requested) information element, an SRS configuration requested (SRS configuration required, or SRS configuration requested) information element, a positioning information requested (positioning information required, or positioning information requested) information element, or the like.

For example, the information indicating that the positioning device re-requests to configure the SRS for the terminal device includes indication information.

For example, when a value of the indication information is "true", it indicates that the positioning device is indicated to re-request to configure the SRS for the terminal device. For another example, when the value of the indication information is "1", it indicates that the positioning device is indicated to re-request to configure the SRS for the terminal device.

In this embodiment, the information indicating that the positioning device re-requests to configure the SRS for the terminal device may explicitly or implicitly indicate the positioning device to re-request to configure the SRS for the terminal device. This is not specifically limited in this application.

In this embodiment, the information indicating that the positioning device re-requests to configure the SRS for the terminal device may directly or indirectly indicate the positioning device to re-request to configure the SRS for the terminal device. This is not specifically limited in this application.

The source access network device indicates, by using the information indicating that the positioning device re-requests to configure the SRS for the terminal device, the positioning device to re-request to configure the SRS for the terminal device. In this way, the positioning device does not understand as: The SRS cannot be configured for the terminal device when the terminal device is within the signal coverage area of the source access network device, and consequently, the positioning device considers that the terminal device cannot be positioned. The positioning device may re-request the serving access network device accessed by the terminal device to configure the SRS for the terminal device.

2. Information Indicating that the Terminal Device has Left the Source Access Network Device.

The terminal device moves from the signal coverage area of the source access network device to the signal coverage area of the first access network device. The source access network device may indicate, to the positioning device, that the terminal device has left the signal coverage area of the source access network device. In this way, the positioning device may determine that the terminal device has left the signal coverage area of the source access network device, or determine that the terminal device has moved to a signal coverage area of another access network device. That is, the positioning device may determine a location status of the terminal device. The positioning device does not understand as: The SRS cannot be configured for the terminal device when the terminal device is within the signal coverage area of the source access network device, and consequently, the positioning device considers that the terminal device cannot be positioned. The positioning device may re-request the serving access network device accessed by the terminal device to configure the SRS for the terminal device.

Specifically, the positioning device may re-request, via the AMF, the serving access network device of the terminal device to configure the SRS for the terminal device. The terminal device moves to the first access network device. If the terminal device accesses the first access network device, the first access network device is the serving access network device of the terminal device.

For example, the information indicating that the terminal device has left the source access network device includes an information element in the positioning information response message. For example, the information indicating that the terminal device has left the source access network device includes a UE left (UE left) information element, or a UE moved out (UE moved out) information element.

For example, the information indicating that the terminal device has left the source access network device includes indication information. For example, when a value of the indication information is "true", it indicates that the terminal device has left the source access network device. For another example, when the value of the indication information is "1", it indicates that the terminal device has left the source access network device.

In this embodiment, the information indicating that the terminal device has left the source access network device may explicitly or implicitly indicate that the terminal device has left the source access network device. This is not specifically limited in this application.

In this embodiment, the information indicating that the terminal device has left the source access network device may directly or indirectly indicate that the terminal device has left the source access network device. This is not specifically limited in this application.

3. Information Indicating that the Terminal Device has Left a Cell Managed by the Source Access Network Device.

The terminal device moves from a cell managed by the source access network device to a cell managed by the first access network device. The source access network device may indicate, to the positioning device, that the terminal device has left the signal coverage area of the source access network device. The positioning device may determine that the terminal device has left the cell managed by the source access network device, or determine that the terminal device has moved to a cell managed by another access network device. That is, the positioning device may determine a location status of the terminal device. In this way, the positioning device does not understand as: The SRS cannot be configured for the terminal device when the terminal device is within the signal coverage area of the source access network device, and consequently, the positioning device considers that the terminal device cannot be positioned. The positioning device may re-request the serving access network device accessed by the terminal device to configure the SRS for the terminal device.

Specifically, the positioning device may re-request, via the AMF, the serving access network device of the terminal device to configure the SRS for the terminal device. The terminal device moves to the first access network device. If the terminal device accesses the first access network device, the first access network device is the serving access network device of the terminal device.

For example, the information indicating that the terminal device has left a cell managed by the source access network device includes an information element in the positioning information response message. For example, the information indicating that the terminal device has left a cell managed by the source access network device includes a cell changed (cell changed) information element or an out of cell (out of cell) information element.

For example, the information indicating that the terminal device has left a cell managed by the source access network device includes indication information.

For example, when a value of the indication information is "true", it indicates that the terminal device has left the cell managed by the source access network device. For another example, when the value of the indication information is "1", it indicates that the terminal device has left the cell managed by the source access network device.

In this embodiment, the information indicating that the terminal device has left a cell managed by the source access network device may explicitly or implicitly indicate that the terminal device has left the cell managed by the source access network device. This is not specifically limited in this application.

In this embodiment, the information indicating that the terminal device has left a cell managed by the source access network device may directly or indirectly indicate that the terminal device has left the cell managed by the source access network device. This is not specifically limited in this application.

4. Information Indicating that the Terminal Device in Inactive State has Left the Source Access Network Device.

The terminal device moves from the signal coverage area of the source access network device to the signal coverage area of a first access network device. The terminal device is in inactive state. The source access network device may indicate, to the positioning device, information that the terminal device in inactive state has left the source access network device. The positioning device may determine that the terminal device in inactive state has left the signal coverage area of the source access network device, or determine that the terminal device in inactive state moves to a signal coverage area of another access network device. That is, the positioning device may determine a location status of the terminal device.

In this way, the positioning device does not understand as: The SRS cannot be configured for the terminal device when the terminal device is within the signal coverage area of the source access network device, and consequently, the positioning device considers that the terminal device cannot be positioned. In addition, the positioning device may not request to configure the SRS for the terminal device first, and the terminal device may access the first access network device after moving to the first access network device. In other words, the positioning device may re-request to configure the SRS for the terminal device or request to configure the SRS for the terminal device again at an interval, but the terminal device has entered a connected state. That is, the terminal device accesses the first access network device. In this way, the positioning device can successfully request to configure the SRS for the terminal device.

Specifically, the positioning device may re-request, via the AMF, the serving access network device of the terminal device to configure the SRS for the terminal device. The terminal device moves to the first access network device. If the terminal device accesses the first access network device, the first access network device is the serving access network device of the terminal device.

For example, the information indicating that the terminal device in inactive state has left the source access network device includes an information element in the positioning information response message.

For example, the information indicating that the terminal device in inactive state has left the source access network device includes a cell changed in inactive state (cell changed in inactive state) information element, or a UE moved out in inactive state (UE move out in inactive state) information element, or the like.

For example, the information indicating that the terminal device in inactive state has left the source access network device includes indication information.

For example, when a value of the indication information is "true", it indicates that the terminal device in inactive state has left the source access network device. For another example, when the value of the indication information is "1", it indicates that the terminal device in inactive state has left the source access network device.

In this embodiment, the information indicating that the terminal device in inactive state has left the source access network device may explicitly or implicitly indicate that the terminal device in inactive state has left the source access network device. This is not specifically limited in this application.

In this embodiment, the information indicating that the terminal device in inactive state has left the source access network device may directly or indirectly indicate that the terminal device in inactive state has left the source access network device. This is not specifically limited in this application.

To enable the terminal device to access the first access network device to which the terminal device moves, the positioning device requests the first access network device to configure the SRS for the terminal device. Optionally, this embodiment further includes step 303 to step 310, and step 303 to step 310 are performed after step 302.

303: The source access network device sends a first paging (RAN paging) message to the first access network device. Correspondingly, the first access network device receives the first paging message from the source access network device.

The source access network device may send the first paging message to the first access network device within a paging area of an access network, to indicate the first access network device to page the terminal device.

Optionally, the first paging message includes at least one of the following: first information, second information, or third information.

The first information is used to indicate that the paging message is used to position the terminal device.

The second information is used to indicate to request positioning information of the terminal device.

The third information is used to request to configure the SRS for the terminal device.

The first information is similar to the third information in step 205 in the embodiment shown in FIG. 2A. The second information is similar to the fourth information in step 205 in the embodiment shown in FIG. 2A. The third information is similar to the fifth information in step 205 in the embodiment shown in FIG. 2A. For details, refer to the related descriptions of the third information, the fourth information, and the fifth information in step 205 in the embodiment shown in FIG. 2A. Details are not described herein again.

The first paging message includes any one or more of the first information, the second information, and the third information. The first access network device may determine, based on the first paging message, that the first access network device pages the terminal device to position the terminal device by the positioning device. In this way, after configuring the SRS for the terminal device, the first access network device releases the terminal device to the inactive state as soon as possible, to reduce energy consumption of the terminal device.

304: The first access network device sends a second paging (paging) message to the terminal device. Correspondingly, the terminal device receives the second paging message from the first access network device.

Step 304 is similar to step 206 in the embodiment shown in FIG. 2A. For details, refer to the related descriptions of step 206 in the embodiment shown in FIG. 2A.

305: The terminal device sends an RRC resume request (RRC resume request) message to the first access network device. Correspondingly, the first access network device receives the RRC resume request message from the terminal device.

306: The first access network device sends a retrieve UE context request (retrieve UE context request) message to the source access network device. Correspondingly, the source access network device receives the retrieve UE context request message from the first access network device.

307: The source access network device sends a retrieve UE context response (retrieve UE context response) message to the first access network device. Correspondingly, the first access network device receives the retrieve UE context response message sent by the source access network device.

308: The first access network device sends an RRC resume (RRC resume) message to the terminal device. Correspondingly, the terminal device receives the RRC resume message from the first access network device.

309: The terminal device sends an RRC resume complete (RRC resume complete) message to the first access network device. Correspondingly, the first access network device receives the RRC resume complete message from the terminal device.

310: The first access network device sends a UE context release (UE context release) message to the source access network device. Correspondingly, the source access network device receives the UE context release message from the first access network device.

It can be learned from step 303 to step 310 that the terminal device initiates an RRC resume request to the first access network device, to access the network. In this way, the positioning device may request, via the AMF, the first access network device to configure the SRS for the terminal device.

In this embodiment of this application, the positioning device sends the positioning information request message to the source access network device. Then, the source access network device sends the positioning information response message to the positioning device. The positioning information response message includes at least one of the following: the information indicating that the positioning device re-requests to configure the SRS for the terminal device; the information indicating that the terminal device has left the source access network device; the information indicating that the terminal device has left the cell managed by the source access network device; or the information indicating that the terminal device in inactive state has left the source access network device. In this way, the positioning device does not understand as: The SRS cannot be configured for the terminal device when the terminal device is within the signal coverage area of the source access network device, and consequently, the positioning device considers that the terminal device cannot be positioned. The positioning device may re-request, in combination with the positioning response message, to configure the SRS for the terminal device, to subsequently position the terminal device.

The embodiment shown in FIG. 3 shows step 301 to step 310. During actual application, not all of step 301 to step 310 need to be performed, and some or all of step 301 to step 310 may be performed based on a requirement.

This application further provides an embodiment. This embodiment is similar to the embodiment shown in FIG. 3, and a difference lies in that step 302 in the embodiment shown in FIG. 3 is performed after step 310. To be specific, after the source access network device receives the UE context release message for the terminal device from the first access network device, the source access network device may determine that the terminal device has accessed the first access network device. Then, the source access network device performs step 302, to ensure that the terminal device has entered the connected state when the positioning device requests to configure the SRS for the terminal device again. In this case, the positioning device may successfully request the first access network device to request configuration of the SRS for the terminal device, so that the positioning device subsequently positions the terminal device.

Figure 4:
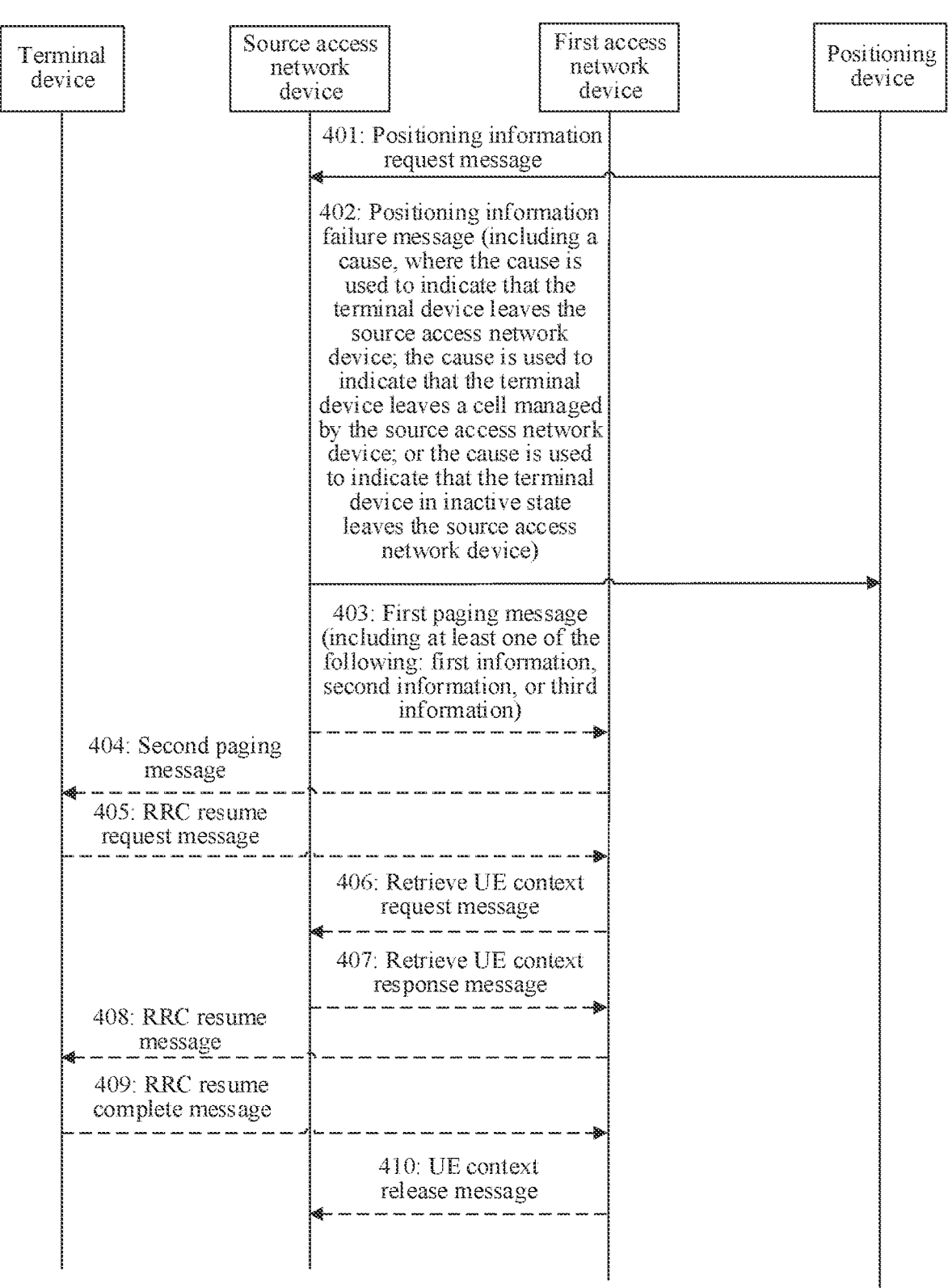
FIG. 4 is a schematic diagram of another embodiment of a communication method according to embodiments of this application.

FIG. 4 is a schematic diagram of another embodiment of a communication method according to embodiments of this application. In FIG. 4, the communication method includes the following steps.

401: A positioning device sends a positioning information request (positioning information request) message to a source access network device. Correspondingly, the source access network device receives the positioning information request message from the positioning device.

Step 401 is similar to step 301 in the embodiment shown in FIG. 3. For details, refer to the related descriptions of step 301 in the embodiment shown in FIG. 3. Details are not described herein again.

402: The source access network device sends a positioning information failure (positioning information failure) message to the positioning device. Correspondingly, the positioning device receives the positioning information failure message from the source access network device.

The positioning information failure message includes a cause (cause). The cause is used to indicate that a terminal device has left the source access device.

Alternatively, the cause is used to indicate that the terminal device has left a cell managed by the source access network device, the cause is used to indicate that the terminal device in inactive state has left the source access network device; or the cause is used to indicate that the terminal device in inactive state has left a cell managed by the source access network device.

For example, a cause information element in the positioning information failure message includes a cause why the terminal device has left the source access network device.

Specifically, the terminal device moves from a signal coverage area of the source access network device to a signal coverage area of a first access network device. The source access network device may indicate, to the positioning device, that the terminal device has left the signal coverage area of the source access network device. In this case, the positioning device may determine that the terminal device has left the signal coverage area of the source access network device. Alternatively, the positioning device determines that the terminal device has moved to a signal coverage area of another access network device. That is, the positioning device may determine a location status of the terminal device. In this way, the positioning device does not understand as: An SRS cannot be configured for the terminal device when the terminal device is within the signal coverage area of the source access network device, and consequently, the positioning device considers that the terminal device cannot be positioned.

Then, the positioning device may re-request a serving access network device of the terminal device to configure the SRS for the terminal device. The terminal device moves to the first access network device. If the terminal device accesses the first access network device, the first access network device is the serving access network device of the terminal device. Specifically, the positioning device may re-request, via an AMF, the serving access network device of the terminal device to configure the SRS for the terminal device.

For example, the cause information element in the positioning information failure message includes a cause why the terminal device has left the cell managed by the source access network device.

Specifically, the terminal device moves from the cell managed by the source access network device to a cell managed by the first access network device. The source access network device may indicate, to the positioning device, that the terminal device has left the signal coverage area of the source access network device, and the positioning device may determine that the terminal device has left the cell managed by the source access network device. Alternatively, the positioning device determines that the terminal device has moved to a cell managed by another access network device. That is, the positioning device may determine a location status of the terminal device.

In this way, the positioning device does not understand as: The SRS cannot be configured for the terminal device when the terminal device is within the signal coverage area of the source access network device, and consequently, the positioning device considers that the terminal device cannot be positioned. Then, the positioning device may re-request the serving access network device of the terminal device to configure the SRS for the terminal device. The terminal device moves to the first access network device. If the terminal device accesses the first access network device, the first access network device is the serving access network device of the terminal device. Specifically, the positioning device may re-request, via the AMF, the serving access network device of the terminal device to configure the SRS for the terminal device.

For example, the cause information element in the positioning information failure message includes a cause why the terminal device in inactive state has left the source access network device.

Specifically, the terminal device moves from the signal coverage area of the source access network device to the signal coverage area of the first access network device. The terminal device is in inactive state. The source access network device may indicate, to the positioning device, information that the terminal device in inactive state has left the source access network device. In this case, the positioning device may determine that the terminal device in inactive state has left the signal coverage area of the source access network device, or the positioning device may determine that the terminal device in inactive state moves to the signal coverage area of the another access network device. That is, the positioning device may determine a location status of the terminal device.

In this way, the positioning device does not understand as: The SRS cannot be configured for the terminal device when the terminal device is within the signal coverage area of the source access network device, and consequently, the positioning device considers that the terminal device cannot be positioned. The positioning device may not request to configure the SRS for the terminal device first, and the terminal device may access the first access network device after moving to the first access network device. To be specific, the positioning device may re-request to configure the SRS for the terminal device or request to configure the SRS for the terminal device at an interval, but the terminal device has entered a connected state, that is, the terminal device accesses the first access network device. In this way, the positioning device can successfully request to configure the SRS for the terminal device. Specifically, the positioning device may re-request, via the AMF, the serving access network device of the terminal device to configure the SRS for the terminal device. The terminal device moves to the first access network device. If the terminal device accesses the first access network device, the first access network device is the serving access network device of the terminal device.

For example, the cause information element in the positioning information failure message includes a cause why the terminal device in inactive state has left the cell managed by the source access network device.

Specifically, the terminal device moves from the cell managed by the source access network device to the cell managed by the first access network device. The source access network device may indicate, to the positioning device, that the terminal device in inactive state has left the signal coverage area of the source access network device. The positioning device may determine that the terminal device in inactive state has left the signal coverage area of the source access network device, or determine that the terminal device in inactive state moves to the signal coverage area of the another access network device. That is, the positioning device may determine a location status of the terminal device.

In this way, the positioning device does not understand as: The SRS cannot be configured for the terminal device when the terminal device is within the signal coverage area of the source access network device, and consequently, the positioning device considers that the terminal device cannot be positioned. The positioning device may not request to configure the SRS for the terminal device first, and the terminal device may access the first access network device after moving to the first access network device. To be specific, the positioning device may re-request to configure the SRS for the terminal device or request to configure the SRS for the terminal device at an interval, but the terminal device has entered a connected state, that is, the terminal device accesses the first access network device. In this way, the positioning device can successfully request to configure the SRS for the terminal device. Specifically, the positioning device may re-request, via the AMF, the serving access network device of the terminal device to configure the SRS for the terminal device. The terminal device moves to the first access network device. If the terminal device accesses the first access network device, the first access network device is the serving access network device of the terminal device.

403: The source access network device sends a first paging (RAN paging) message to the first access network device. Correspondingly, the first access network device receives the first paging message from the source access network device.

404: The first access network device sends a second paging (paging) message to the terminal device. Correspondingly, the terminal device receives the second paging message from the first access network device.

405: The terminal device sends an RRC resume request (RRC resume request) message to the first access network device. Correspondingly, the first access network device receives the RRC resume request message from the terminal device.

406: The first access network device sends a retrieve UE context request (retrieve UE context request) message to the source access network device. Correspondingly, the source access network device receives the retrieve UE context request message from the first access network device.

407: The source access network device sends a retrieve UE context response (retrieve UE context response) message to the first access network device. Correspondingly, the first access network device receives the retrieve UE context response message from the source access network device.

408: The first access network device sends an RRC resume (RRC resume) message to the terminal device. Correspondingly, the terminal device receives the RRC resume message from the first access network device.

409: The terminal device sends an RRC resume complete (RRC resume complete) message to the first access network device. Correspondingly, the first access network device receives the RRC resume complete message from the terminal device.

410: The first access network device sends a UE context release (UE context release) message to the source access network device. Correspondingly, the source access network device receives the UE context release message from the first access network device.

Step 403 to step 410 are similar to step 303 to step 310 in the embodiment shown in FIG. 3. For details, refer to the related descriptions of step 303 to step 310 in the embodiment shown in FIG. 3. Details are not described herein again.

In this embodiment of this application, the positioning device sends the positioning information request message to the source access network device. Then, the source access network device sends the positioning information response message to the positioning device. The positioning information response message includes the cause. The cause is used to indicate that the terminal device has left the source access network device; the cause is used to indicate that the terminal device has left the cell managed by the source access network device; or the cause is used to indicate that the terminal device in inactive state has left the source access network device. In this way, the positioning device does not understand as: The SRS cannot be configured for the terminal device when the terminal device is within the signal coverage area of the source access network device, and consequently, the positioning device considers that the terminal device cannot be positioned. The positioning device may re-request, in combination with the positioning information failure message, to configure the SRS for the terminal device, to subsequently position the terminal device.

The embodiment shown in FIG. 4 shows step 401 to step 410. During actual application, not all of step 401 to step 410 need to be performed, and some or all of step 401 to step 410 may be performed based on a requirement.

This application further provides an embodiment. This embodiment is similar to the embodiment shown in FIG. 4, and a difference lies in that step 402 in the embodiment shown in FIG. 4 is performed after step 410. To be specific, after the source access network device receives the UE context release message for the terminal device from the first access network device, the source access network device may determine that the terminal device has accessed the first access network device. Then, the source access network device performs step 402. This ensures that the terminal device has entered a connected state when the positioning device requests to configure the SRS for the terminal device again. In this case, the positioning device may successfully request the first access network device to request configuration of the SRS for the terminal device, so that the positioning device subsequently positions the terminal device.

Figure 5:
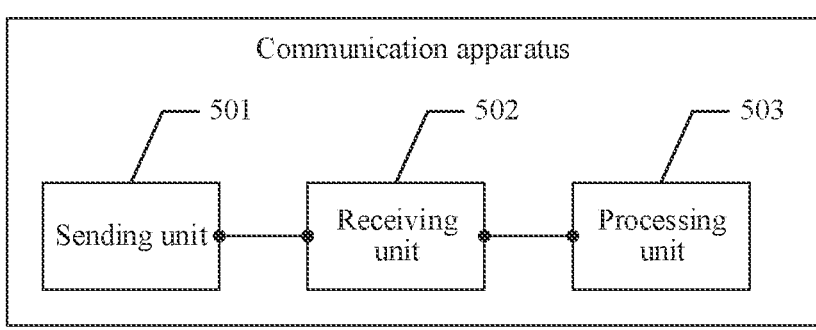
FIG. 5 is a schematic diagram of a structure of a communication apparatus according to an embodiment of this application.

The following describes a communication apparatus provided in embodiments of this application. FIG. 5 is a schematic diagram of a structure of a communication apparatus 500 according to an embodiment of this application. The communication apparatus 500 includes a sending unit 501, a receiving unit 502, and a processing unit 503.

Figure 2C:
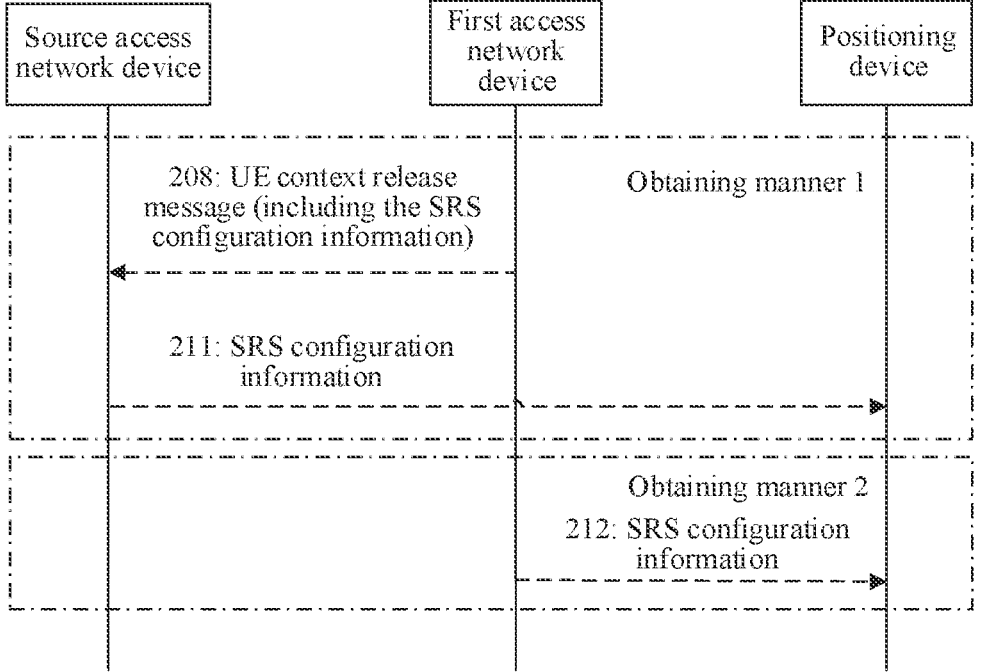
FIG. 2C is a schematic diagram of another embodiment of a communication method according to embodiments of this application.

When the communication apparatus 500 is an access network device or a chip in the access network device, the communication apparatus 500 may be configured to perform all or some of the steps performed by the first access network device in the embodiments shown in FIG. 2A, FIG. 2B, and FIG. 2C. Refer to the related descriptions in the method embodiments shown in FIG. 2A, FIG. 2B, and FIG. 2C.

For example, the sending unit 501 is configured to perform step 201, step 204, step 206, and step 208 in the embodiment shown in FIG. 2A. The receiving unit 502 is configured to perform step 202, step 205, and step 207 in the embodiment shown in FIG. 2A. The processing unit 503 is configured to perform step 203 in the embodiment shown in FIG. 2A.

For example, the sending unit 501 is configured to perform step 204 in the sending manner 1 in the embodiment shown in FIG. 2B; the sending unit 501 is configured to perform step 204 in the sending manner 2 in the embodiment shown in FIG. 2B; or the sending unit 501 is configured to perform step 204*a* and step 204 in the sending manner 3 in the embodiment shown in FIG. 2B.

For example, the sending unit 501 is configured to perform step 208 in the obtaining manner 1 in the embodiment shown in FIG. 2C; or the sending unit 501 is configured to perform step 212 in the obtaining manner 2 in the embodiment shown in FIG. 2C.

Figure 6:
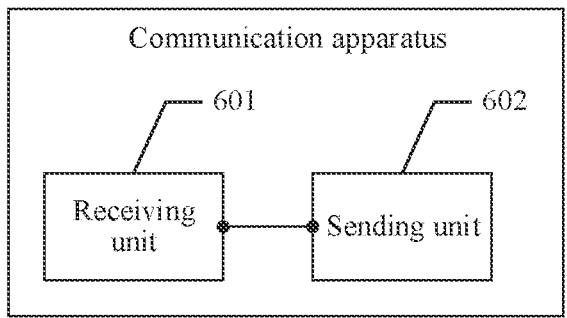
FIG. 6 is another schematic diagram of a structure of a communication apparatus according to an embodiment of this application.

The following describes a communication apparatus provided in embodiments of this application. FIG. 6 is a schematic diagram of a structure of a communication apparatus 600 according to an embodiment of this application. The communication apparatus 600 includes a receiving unit 601 and a sending unit 602.

When the communication apparatus 600 is an access network device or a chip in the access network device, the communication apparatus 600 may be configured to perform all or some of the steps performed by the source access network device in the embodiments shown in FIG. 2A, FIG. 2C, FIG. 3, and FIG. 4. Refer to the related descriptions in the method embodiments shown in FIG. 2A, FIG. 2C, FIG. 3, and FIG. 4.

For example, the receiving unit 601 is configured to perform step 201, step 208, and step 209 in the embodiment shown in FIG. 2A. The sending unit 602 is configured to perform step 202, step 205, and step 210 in the embodiment shown in FIG. 2A.

For example, the receiving unit 601 is configured to perform step 208 in the obtaining manner 1 in the embodiment shown in FIG. 2C. The sending unit 602 is configured to perform step 211 in the obtaining manner 1 in the embodiment shown in FIG. 2C.

For example, the receiving unit 601 is configured to perform step 301, step 306, and step 310 in the embodiment shown in FIG. 3. The sending unit 602 is configured to perform step 302, step 303, and step 307 in the embodiment shown in FIG. 3.

For example, the receiving unit 601 is configured to perform step 401, step 406, and step 410 in the embodiment shown in FIG. 4. The sending unit 602 is configured to perform step 402, step 403, and step 407 in the embodiment shown in FIG. 4.

When the communication apparatus 600 is a terminal device or a chip in the terminal device, the communication apparatus 600 may be configured to perform all or some of the steps performed by the terminal device in the embodiments shown in FIG. 2A, FIG. 2B, FIG. 3, and FIG. 4. Refer to the related descriptions in the method embodiments shown in FIG. 2A, FIG. 2B, FIG. 3, and FIG. 4.

For example, the receiving unit 601 is configured to perform step 204 and step 206 in the embodiment shown in FIG. 2A, and the sending unit 602 is configured to perform step 207 in the embodiment shown in FIG. 2A.

For example, the receiving unit 601 is configured to perform step 204 in the sending manner 1 in the embodiment shown in FIG. 2B; the receiving unit 601 is configured to perform step 204 in the sending manner 2 in the embodiment shown in FIG. 2B; or the receiving unit 601 is configured to perform step 204*a* and step 204 in the sending manner 3 in the embodiment shown in FIG. 2B.

For example, the receiving unit 601 is configured to perform step 304 and step 308 in the embodiment shown in FIG. 3, and the sending unit 602 is configured to perform step 305 and step 309 in the embodiment shown in FIG. 3.

For example, the receiving unit 601 is configured to perform step 404 and step 408 in the embodiment shown in FIG. 4, and the sending unit 602 is configured to perform step 405 and step 409 in the embodiment shown in FIG. 4.

When the communication apparatus 600 is a positioning device or a chip in the positioning device, the communication apparatus 600 may be configured to perform all or some of the steps performed by the positioning device in the embodiments shown in FIG. 2A, FIG. 2C, FIG. 3, and FIG. 4. Refer to the related descriptions in the method embodiments shown in FIG. 2A, FIG. 2B, FIG. 3, and FIG. 4.

For example, the receiving unit 601 is configured to perform step 210 in the embodiment shown in FIG. 2A, and the sending unit 602 is configured to perform step 209 in the embodiment shown in FIG. 2A.

For example, the receiving unit 601 is configured to perform step 211 in the obtaining manner 1 or step 212 in the obtaining manner 2 in the embodiment shown in FIG. 2C.

For example, the receiving unit 601 is configured to perform step 301 in the embodiment shown in FIG. 3, and the sending unit 602 is configured to perform step 301 in the embodiment shown in FIG. 3.

For example, the receiving unit 601 is configured to perform step 401 in the embodiment shown in FIG. 4, and the sending unit 602 is configured to perform step 401 in the embodiment shown in FIG. 4.

When the communication apparatus 600 is an access network device or a chip in the access network device, the communication apparatus 600 may be configured to perform all or some of the steps performed by the first access network device in the embodiments shown in FIG. 3 and FIG. 4. Refer to the related descriptions in the method embodiments shown in FIG. 3 and FIG. 4.

For example, the receiving unit 601 is configured to perform step 303, step 305, step 307, and step 309 in the embodiment shown in FIG. 3. The sending unit 602 is configured to perform step 304, step 306, step 308, and step 310 in the embodiment shown in FIG. 3.

For example, the receiving unit 601 is configured to perform step 403, step 405, step 407, and step 409 in the embodiment shown in FIG. 4. The sending unit 602 is configured to perform step 404, step 406, step 408, and step 410 in the embodiment shown in FIG. 4.

Figure 7:
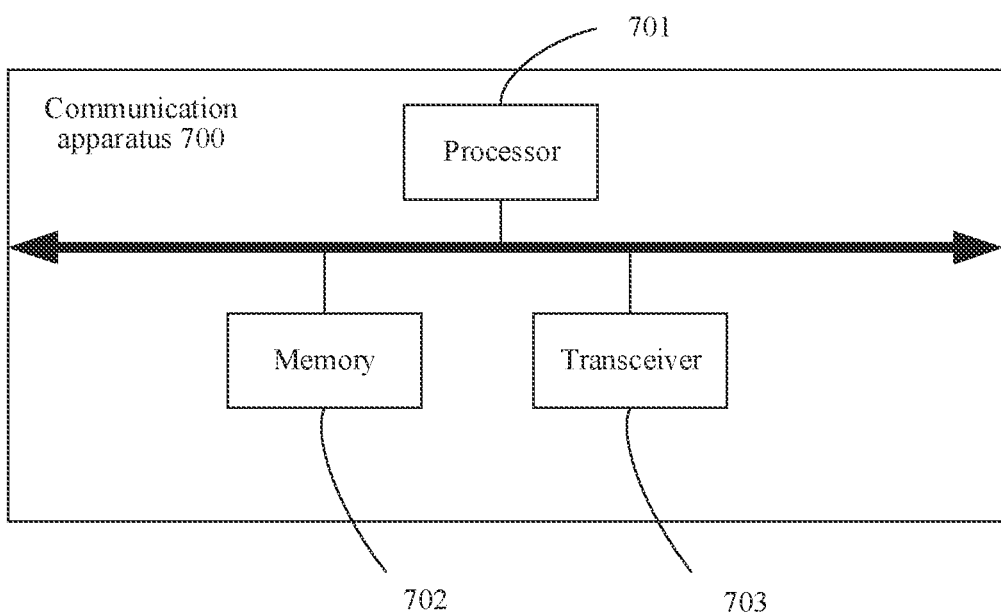
FIG. 7 is another schematic diagram of a structure of a communication apparatus according to an embodiment of this application.

This application further provides a communication apparatus. FIG. 7 is another schematic diagram of a structure of a communication apparatus 700 according to an embodiment of this application.

The communication apparatus 700 includes a processor 701, a memory 702, and a transceiver 703.

The processor 701, the memory 702, and the transceiver 703 are separately connected through a bus, and the memory stores computer instructions.

When the communication apparatus 700 is an access network device or a chip in the access network device, the communication apparatus 700 may be configured to perform the steps performed by the first access network device in the embodiments shown in FIG. 2A, FIG. 2B, FIG. 2C, FIG. 3, and FIG. 4. Refer to the related descriptions in the foregoing method embodiments.

The sending unit 501 and the receiving unit 502 in FIG. 5 may be specifically the transceiver 703 in this embodiment. Therefore, specific implementation of the transceiver 703 is not described again. The processing unit 503 shown in FIG. 5 may be specifically the processor 701 in this embodiment. Therefore, specific implementation of the processor 701 is not described again.

When the communication apparatus 700 is an access network device or a chip in the access network device, the communication apparatus 700 may be configured to perform the steps performed by the source access network device in the embodiments shown in FIG. 2A, FIG. 2C, FIG. 3, and FIG. 4. Refer to the related descriptions in the foregoing method embodiments.

The receiving unit 601 and the sending unit 602 in FIG. 6 may be specifically the transceiver 703 in this embodiment. Therefore, specific implementation of the transceiver 703 is not described again.

When the communication apparatus 700 is a positioning device or a chip in the positioning device, the communication apparatus 700 may be configured to perform the steps performed by the positioning device in the embodiments shown in FIG. 2A, FIG. 2C, FIG. 3, and FIG. 4. Refer to the related descriptions in the foregoing method embodiments.

The receiving unit 601 and the sending unit 602 in FIG. 6 may be specifically the transceiver 703 in this embodiment. Therefore, specific implementation of the transceiver 703 is not described again.

Figure 8:
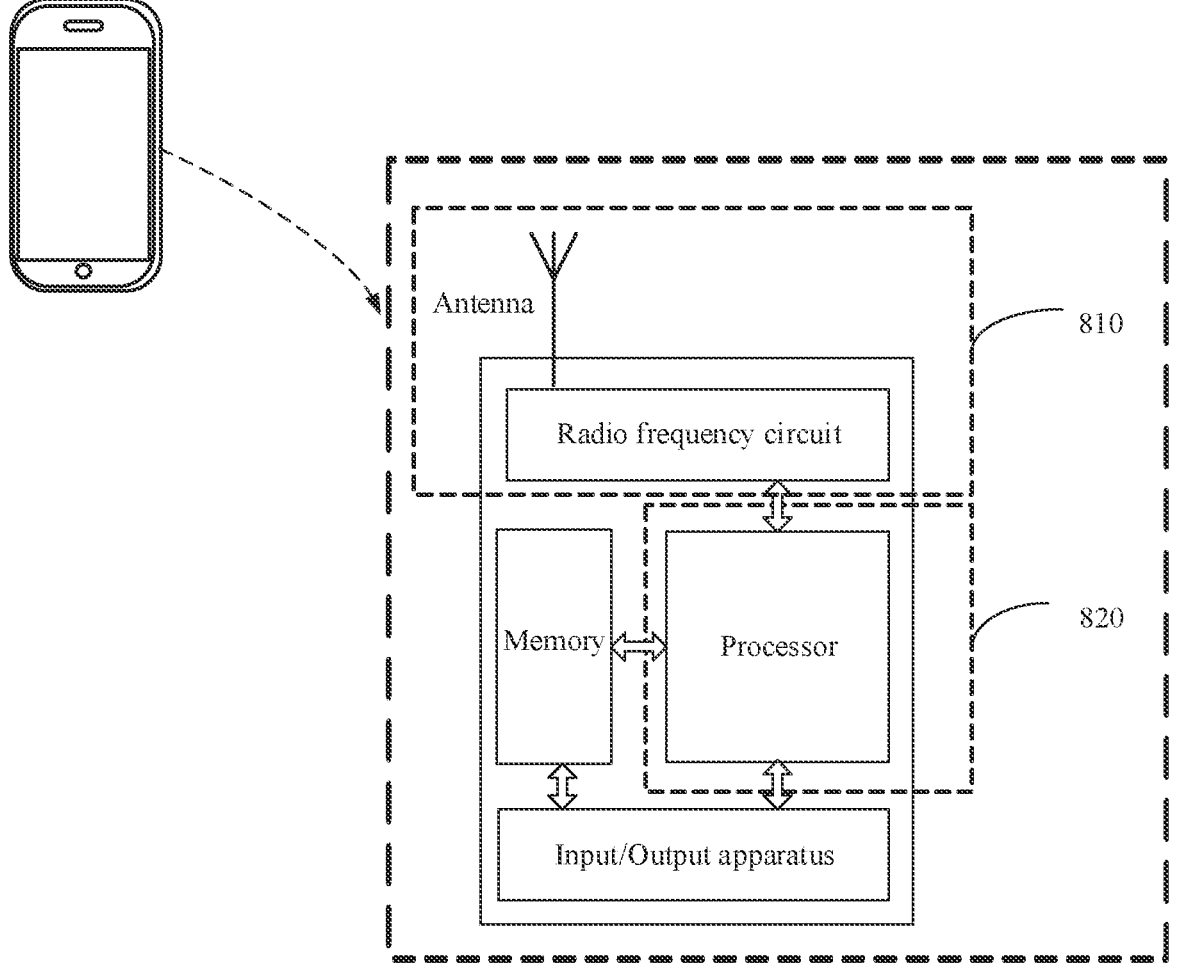
FIG. 8 is a schematic diagram of a structure of a terminal device according to an embodiment of this application.

FIG. 8 is a schematic diagram of a possible structure of a terminal device below.

FIG. 8 is a simplified schematic diagram depicting the structure of the terminal device. For ease of understanding and convenience of figure illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 8. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In embodiments of this application, the antenna and a radio frequency circuit that have a transceiver function may be considered as a transceiver unit of the terminal device, and a processor that has a processing function may be considered as a processing unit of the terminal device. As shown in FIG. 8, the terminal device includes a transceiver unit 810 and a processing unit 820. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 810 and that is configured to implement a receiving function may be considered as a receiving unit, and a component that is in the transceiver unit 810 and that is configured to implement a sending function may be considered as a sending unit. That is, the transceiver unit 810 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 810 is configured to perform a sending operation and a receiving operation that are of the terminal device in the foregoing method embodiments, and the processing unit 820 is configured to perform an operation other than the receiving and sending operations of the terminal device in the foregoing method embodiments.

In a possible implementation, the transceiver unit 810 is configured to perform step 204, step 206, and step 207 in the embodiment shown in FIG. 2A.

In another possible implementation, the transceiver unit 810 is configured to perform step 204 in the sending manner 1 in the embodiment shown in FIG. 2B, step 204 in the sending manner 2 in the embodiment shown in FIG. 2B, or step 204a and step 204 in the sending manner 3 in the embodiment shown in FIG. 2B.

In another possible implementation, the transceiver unit 810 is configured to perform step 304, step 305, step 308, and step 309 in the embodiment shown in FIG. 3.

In another possible implementation, the transceiver unit 810 is configured to perform step 404, step 405, step 408, and step 409 in the embodiment shown in FIG. 4.

When the terminal device is a chip, the chip includes a transceiver unit and a processing unit. The transceiver unit may be an input/output circuit or a communication interface. The processing unit is a processor, a microprocessor, an integrated circuit, or a logic circuit integrated on the chip. In the foregoing method embodiments, a sending operation is corresponding to an output of the input/output circuit, and a receiving operation is corresponding to an input of the input/output circuit.

Figure 9:
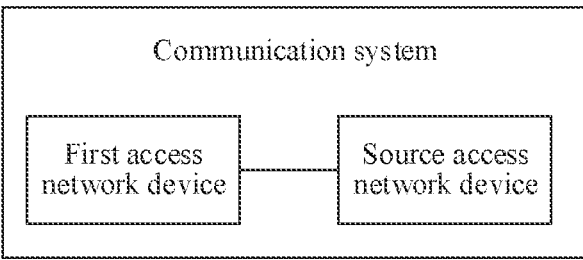
FIG. 9 is a schematic diagram of a communication system according to an embodiment of this application.

Refer to FIG. 9. An embodiment of this application further provides a communication system. The communication system includes a first access network device and a source access network device. The first access network device is configured to perform all or some of the steps performed by the first access network device in the embodiments shown in FIG. 2A and FIG. 2C. The source access network device is configured to perform all or some of the steps performed by the source access network device in the embodiments shown in FIG. 2A, FIG. 2B, and FIG. 2C.

Figure 10:
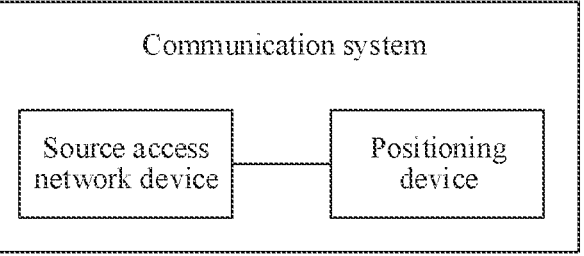
FIG. 10 is another schematic diagram of a communication system according to an embodiment of this application.

Refer to FIG. 10. An embodiment of this application further provides another communication system. The communication system includes a source access network device and a positioning device. The source access network device is configured to perform all or some of the steps performed by the source access network device in the embodiments shown in FIG. 3 and FIG. 4. The positioning device is configured to perform all or some of the steps performed by the positioning device in the embodiments shown in FIG. 3 and FIG. 4.

An embodiment of this application further provides a computer program product including computer instructions. When the computer program product runs on a computer, the computer is enabled to perform the communication methods in the embodiments shown in FIG. 2A, FIG. 2B, FIG. 2C, FIG. 3, and FIG. 4.

An embodiment of this application further provides a computer-readable storage medium, including computer instructions. When the computer instructions are run on a computer, the computer is enabled to perform the communication methods in embodiments shown in FIG. 2A, FIG. 2B, FIG. 2C, FIG. 3, and FIG. 4.

An embodiment of this application further provides a chip apparatus, including a processor, configured to invoke a computer program or computer instructions stored in a memory, so that the processor performs the communication methods in the embodiments shown in FIG. 2A, FIG. 2B, FIG. 2C, FIG. 3, and FIG. 4.

Optionally, the processor is coupled to the memory through an interface.

Optionally, the chip apparatus further includes the memory, and the memory stores the computer program or the computer instructions.

The processor mentioned above may be a general-purpose central processing unit, a microprocessor, an application-specific integrated circuit (application-specific integrated circuit, ASIC), or one or more integrated circuits for controlling program execution of the communication methods in the embodiments shown in FIG. 2A, FIG. 2B, FIG. 2C, FIG. 3, and FIG. 4. The memory mentioned above may be a read-only memory (read-only memory, ROM), another type of static storage device that can store static information and instructions, a random access memory (random access memory, RAM), or the like.

In addition, it should be noted that the described apparatus embodiments are merely examples. The units described as separate parts may or may not be physically separate, and parts displayed as units may or may not be physical units, may be located in one position, or may be distributed on a plurality of network units. Some or all of the modules may be selected based on an actual requirement to achieve the objectives of the solutions of embodiments. In addition, in the accompanying drawings of the apparatus embodiments provided in this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When the software is used to implement the embodiments, all or a part of the embodiments may be implemented in a form of a computer program product.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, network device, local computing device, computing device, or data center to another website, computer, network device, local computing device, computing device, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, for example, a network device, a local computing device, or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (Solid State Disk, SSD)), or the like.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application.

In conclusion, the foregoing is merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A communication method, wherein the method comprises:

sending, by a first access network device, a retrieve UE context request message to a source access network device;

receiving, by the first access network device, a retrieve UE context response message from the source access network device, wherein the retrieve UE context response message comprises reference information for configuring a sounding reference signal (SRS) of a terminal device in an inactive state and a routing identifier, and wherein the routing identifier identifies positioning device;

determining, by the first access network device, SRS configuration information of the terminal device based on the reference information; and sending, by the first access network device, the SRS configuration information to the terminal device.

2. The method according to claim 1, wherein the reference information comprises information about a SRS transmission characteristic, and the information about the SRS transmission characteristic comprises at least one of a sending periodicity or a bandwidth of the SRS configured for the terminal device and recommended by the positioning device.

3. The method according to claim 1, wherein the retrieve UE context request message comprises one of first information for requesting the reference information or second information for requesting positioning information of the terminal device.

4. The method according to claim 1, wherein the sending, by the first access network device, the SRS configuration information to the terminal device comprises:

sending, by the first access network device, a radio resource control (RRC) release message to the terminal device, wherein the RRC release message comprises the SRS configuration information.

5. A communication method, wherein the method comprises:

receiving, by a source access network device, a retrieve UE context request message from a first access network device; and sending, by the source access network device, a retrieve UE context response message to the first access network device, wherein the retrieve UE context response message comprises reference information for configuring a sounding reference signal (SRS) of a terminal device in an inactive state and a routing identifier, and wherein the routing identifier identifies a positioning device.

6. The method according to claim 5, wherein the reference information comprises information about a SRS transmission characteristic, and the information about the SRS transmission characteristic comprises at least one of a sending periodicity or a bandwidth of the SRS configured for the terminal device and recommended by the positioning device.

7. The method according to claim 5, wherein the retrieve UE context request message comprises one of first information for requesting the reference information or second information for requesting positioning information of the terminal device.

8. The method according to claim 5, wherein the method further comprises:

sending, by the source access network device, a positioning information failure message to the positioning device, wherein the positioning information failure message indicates that the terminal device has left the source access network device.

9. A communication method, wherein the method comprises:

sending, by a terminal device, a radio resource control (RRC) resume request message to a first access network device; and receiving, by the terminal device, an RRC release message from the first access network device, wherein the RRC release message comprises sounding reference signal (SRS) configuration information of the terminal device, and the SRS configuration information is determined by the first access network device based on reference information for configuring an SRS of the terminal device, and wherein the first access network device receives a retrieve UE context response message from a source access network device that comprises a routing identifier, wherein the routing identifier identifies a positioning device.

10. The method according to claim 9, wherein the reference information comprises information about a SRS transmission characteristic, and the information about the SRS transmission characteristic comprises at least one of a sending periodicity or a bandwidth of the SRS configured for the terminal device and recommended by the positioning device.

* * * * *